United States Patent
Sakai et al.

(10) Patent No.: US 6,892,119 B2
(45) Date of Patent: May 10, 2005

(54) VEHICLE ANTITHEFT DEVICE AND VEHICLE ANTITHEFT SYSTEM

(75) Inventors: Naoki Sakai, Hyogo (JP); Tadayuki Yamashita, Hyogo (JP); Toshihiko Danno, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/395,151

(22) Filed: Mar. 25, 2003

(65) Prior Publication Data

US 2004/0193342 A1 Sep. 30, 2004

(51) Int. Cl.[7] ............................................... G06F 7/00
(52) U.S. Cl. ........................................................ 701/36
(58) Field of Search ........................ 701/29, 32, 33–36; 307/9.1, 10.2, 10.5; 340/425.5, 426.1, 426.12, 5.2, 500

(56) References Cited

U.S. PATENT DOCUMENTS

2003/0160692 A1 * 8/2003 Nonaka ................. 340/539.11

* cited by examiner

*Primary Examiner*—Yonel Beaulieu
(74) *Attorney, Agent, or Firm*—Oliff & Berridge, PLC

(57) ABSTRACT

A judgment unit and a control unit are provided in a vehicle antitheft device. On the basis of a theft occurrence signal from a security device which can detect occurrence of theft of a vehicle and GPS signals from a GPS receiver which can detect positional information of the vehicle, the judgment unit judges whether the vehicle is near a place such as a police station or not, when vehicle theft has occurred. When it is concluded that the vehicle is near the place such as the police station during occurrence of the vehicle theft, the control unit makes control to stop the vehicle.

28 Claims, 13 Drawing Sheets

VEHICLE ANTITHEFT DEVICE AND VEHICLE ANTITHEFT SYSTEM

The present disclosure relates to the subject matter contained in Japanese Patent Application No. 2001-390816 filed on Dec. 25, 2001, which is incorporated herein by reference in its entirety.

BACKGROUND OF THE INVENTION

Field of the Invention

The present invention relates to a vehicle antitheft device and a vehicle antitheft system, and particularly relates to a vehicle antitheft device and a vehicle antitheft system by which a stolen vehicle can be restored to an owner thereof in safety.

Cases of theft such as vehicle theft or vehicle-break-in theft have a tendency to increase, which is becoming an object of public concern. In recent years, therefore, various vehicle antitheft devices have been conceived for preventing vehicle theft. For example, some vehicle antitheft devices are designed for giving an alarm such as a siren or lighting a lamp or the like as soon as a door lock of a vehicle is broken or a window glass such as a front window glass, a rear window glass or a side window glass is broken.

By giving an alarm or lighting a lamp in such a manner, it is possible to notify people in the surroundings that the vehicle is being stolen. Thus, the damage kept to the minimum can be expected.

However, if no one is in the surroundings or if the thief trying to steal the vehicle totally neglects the sound of the siren or the lighting of the lamp, no antitheft effect can be exerted at all.

In addition, vehicle theft is often committed by thieves in a group. It is therefore very difficult to find a stolen vehicle. Thus, the current situation seems to be that the probability that the stolen vehicle will be restored to its owner is very low.

SUMMARY OF THE INVENTION

The invention was developed in consideration of the foregoing problems, and an object of the invention is to provide a vehicle antitheft device and a vehicle antitheft system by which a stolen vehicle can be secured in an early stage even if the vehicle theft occurs.

In order to achieve the object, according to a first aspect of the invention, there is provided a vehicle antitheft device (1) including a theft occurrence detection unit for detecting occurrence of vehicle theft and outputs a theft signal, a position information detection unit for detecting position information of a vehicle and outputs a position signal, a first judgment unit for judging whether the vehicle is in a predetermined area based on the theft signal and the position signal, when the vehicle theft occurs, and a first control unit for making predetermined control on the vehicle when the first judgment unit concludes that the vehicle is in the predetermined area.

According to the vehicle antitheft device (1), when it is concluded that a vehicle is in a predetermined area (for example, near a police station or in a place where person's attention can be easily attracted) during the occurrence of theft of the vehicle, predetermined control (for example, stopping the engine or blinking the lamp) is made on the vehicle.

For example, when the engine of a stolen vehicle is stopped near a police station, a policeman can find the stolen vehicle easily. Accordingly, even if vehicle theft occurs, the stolen vehicle can be secured in an early stage.

In addition, according to a second aspect of the invention, there is provided a vehicle antitheft device (2) a theft occurrence detection unit for detecting occurrence of vehicle theft and outputs a theft signal, a first reception unit for receiving a local signal, which includes a vehicle control code and is transmitted locally in a predetermined area, a second judgment unit for judging whether the vehicle control code has been received based on the theft signal and the local signal, when the vehicle theft occurs, and a second control unit for making predetermined control on a vehicle when the second judgment unit concludes that the vehicle control code has been received.

According to the vehicle antitheft device (2), when a vehicle control code transmitted locally from the first transmitter installed in a predetermined area (for example, a police station, or a place such as a dock where it is highly likely that stolen vehicles are collected for overseas transport) is received during the occurrence of theft of the vehicle, predetermined control (for example, stopping the engine or blinking the lamp) is made on the vehicle.

For example, if the first transmitter is installed beforehand in a dock where it is highly likely that stolen vehicles are collected, the engine of a stolen vehicle can be stopped or the lamp thereof can be blinked when the stolen vehicle enters the dock.

Thus, a policeman or the like can find the stolen vehicle easily as well as the stolen vehicle can be prevented from being transported overseas. Accordingly, even if vehicle theft occurs, the stolen vehicle can be secured in an early stage.

In addition, according to a third aspect of the invention, there is provided a vehicle antitheft device (3) having: a theft occurrence detection unit for detecting occurrence of vehicle theft and outputs a theft signal, a second reception unit for receiving a call signal, which includes a call identification information and is transmitted through a public circuit, a third judgment unit for judging whether a vehicle is out of a service area for reception of the call signal based on the theft signal and a reception state of the second reception unit, when the vehicle theft occurs, and a third control unit for making predetermined control on the vehicle when the third judgment unit concludes that the vehicle is out of the service area.

The service area where a call signal transmitted through a public circuit and including call identification information can be received is determined in advance on the basis of a contract or the like with a service company. For example, when the vehicle mounted with the second reception unit (for example, a receiver for utilizing radio selective calling service, that is, a so-called pager terminal) for receiving the call signal is out of the predetermined service area, the second reception unit cannot receive the call signal, so that the vehicle cannot receive the service from the service company.

In other words, when the call signal cannot be received (that is, when the receiving condition in the second reception unit suffers conspicuous deterioration), it means that the vehicle is out of the service area.

According to the vehicle antitheft device (3), when it is concluded on the basis of the second reception unit mounted on the vehicle that the vehicle is out of the service area for reception of the call signal (that is, the receiving condition in the second reception unit suffers conspicuous deterioration) during the occurrence of theft of the vehicle, predetermined control (for example, stopping the engine or blinking the lamp) is made on the vehicle.

For example, when a stolen vehicle is out of the service area, the engine of the stolen vehicle is stopped so that the stolen vehicle can be prevented from being transported far away. Accordingly, even if vehicle theft occurs, the stolen vehicle can be secured in an early stage.

In addition, according to a fourth aspect of the invention, there is provided a vehicle antitheft device (4) having the configuration defined in anyone of the vehicle antitheft devices (1) to (3), and further having: a fourth judgment unit for judging whether the vehicle theft has occurred based on the theft signal, a first confirmation unit for confirming whether a signal to be acquired has been acquired normally, when the fourth judgment unit concludes that vehicle theft has occurred, and a first processing unit for performing predetermined processing based on a confirmation result obtained by the first confirmation unit.

According to the vehicle antitheft device (4), when it is confirmed whether a signal to be acquired (for example, a signal from the positional information detection unit) has been acquired normally or not during the occurrence of theft of the vehicle, predetermined control (for example, stopping the engine) is made on the basis of the confirmation result thereof.

For example, when a GPS signal cannot be acquired normally (for example, when a GPS antenna has been removed or broken by the thief), the engine is stopped. Thus, the antitheft function can be exerted even if a part of equipment required for antitheft has been removed or broken.

In addition, according to a fifth aspect of the invention, there is provided a vehicle antitheft device (5) having: a second reception unit for receiving a call signal, which includes a call identification information and is transmitted through a public circuit, a fifth judgment unit for judging whether a theft occurrence code, which is set in advance, has been received, based on the call signal, a first reception unit for receiving a local signal, which includes a vehicle control code and is transmitted locally in a predetermined area, a sixth judgment unit for judging whether the vehicle control code has been received based on the local signal, when the fifth judgment unit concludes that the theft occurrence code has been received, and a fourth control unit for making predetermined control on the vehicle when the sixth judgment unit concludes that the vehicle control code has been received.

According to the vehicle antitheft device (5), when a theft occurrence code transmitted through a public circuit is received and a vehicle control code transmitted locally from the first transmitter installed in a predetermined area (for example, a police station, or a place such as a dock where it is highly likely that stolen vehicles are collected for overseas transport) is received, predetermined control (for example, stopping the engine or blinking the lamp) is made on the vehicle.

For example, when the owner of a vehicle becomes aware of theft of the vehicle and uses a closest telephone set, a portable telephone, or the like, to transmit a theft occurrence code selectively to the second reception unit (for example, a receiver for utilizing radio selective calling service, that is, a so-called pager terminal) mounted on the vehicle, the stolen vehicle can be switched to a theft occurrence mode.

That is, when the vehicle control code transmitted locally from the first transmitter installed in the predetermined area is received in the condition that the vehicle has been switched to the theft occurrence mode, the predetermined control will be made on the stolen vehicle. For example, if the first transmitter is installed beforehand in a place such as a dock where it is highly likely that stolen vehicles are collected, a policeman or the like can find the stolen vehicle easily as well as the stolen vehicle can be prevented from being transported overseas. Accordingly, even if vehicle theft occurs, the stolen vehicle can be secured in an early stage.

In addition, according to a sixth aspect of the invention, there is provided a vehicle antitheft device (6) having: a second reception unit for receiving a call signal, which includes a call identification information and is transmitted through a public circuit, a fifth judgment unit for judging whether a theft occurrence code, which is set in advance, has been received, based on the call signal, a position information detection unit for detecting position information of a vehicle and outputs a position signal, a seventh judgment unit for judging whether the vehicle is in a predetermined area based on the position signal, when the fifth judgment unit concludes that the theft occurrence code has been received, and a fifth control unit for making predetermined control on the vehicle when the seventh judgment unit concludes that the vehicle is in the predetermined area.

According to the vehicle antitheft device (6), when a theft occurrence code transmitted through a public circuit is received and it is concluded that the vehicle is in a predetermined area (for example, a place near a police station, or a place where persons' attention can be easily attracted), predetermined control (for example, stopping the engine or blinking the lamp) is made on the vehicle.

For example, when the owner of a vehicle becomes aware of theft of the vehicle and uses a closest telephone set, a portable telephone, or the like, to transmit a theft occurrence code selectively to the second reception unit (for example, a receiver for utilizing radio selective calling service, that is, a so-called pager terminal) mounted on the vehicle, the stolen vehicle can be switched to a theft occurrence mode.

That is, when it is concluded that the vehicle is in the predetermined area in the condition that the vehicle has been switched to the theft occurrence mode, the predetermined control will be made on the vehicle. For example, if the engine of the stolen vehicle is stopped near a police station, a policeman can find the stolen vehicle easily. Accordingly, even if vehicle theft occurs, the stolen vehicle can be secured in an early stage.

In addition, according to a seventh aspect of the invention, there is provided a vehicle antitheft device (7) having the configuration defined in the vehicle antitheft device (5) or (6), and further having: a position information detection unit for detecting position information of a vehicle and outputs a position signal, first selection means for selecting a service area for reception of the call signal, based on the position signal, and first switching means for switching the service area based on selection of the first selection unit.

In addition, according to an eighth aspect of the invention, there is provided a vehicle antitheft device (8) having the configuration defined in the vehicle antitheft device (5) or (6), and further having: a second selection unit for selecting a service area for reception of the call signal, based on a reception state of the second reception unit, and a second switching unit for switching the service area based on selection of the second selection unit.

The service area where a call signal transmitted through a public circuit and including call identification information can be received is determined in advance on the basis of a contract or the like with a service company, as described above. For example, when the vehicle mounted with the second reception unit (for example, a receiver for utilizing radio selective calling service, that is, a so-called pager terminal) for receiving the call signal is out of the predetermined service area (the area determined on the basis of a contract with the service company), the signal addressed to the second reception unit cannot be received by the second reception unit.

This is because the signal addressed to the second reception unit is transmitted only to the predetermined service area (for example, Hyogo Prefecture) but not to any other service area while each service area is divided from the other service areas by available frequency.

Accordingly, even in the case where a code showing emergency such as a theft occurrence code were designed to be transmitted to a broad range (for example, service areas throughout the country) over the divisions among the services areas, the theft occurrence code still could not be received by the second reception unit if the receiving frequency of the second reception unit is not tuned up. Thus, the stolen vehicle could not be switched to the theft occurrence mode.

However, according to the vehicle antitheft device (7), the service area where the call signal can be received is selected on the basis of a signal from the positional information detection unit, and in accordance with the selection, the service area is switched (for example, the receiving frequency is switched) automatically. Thus, even if the vehicle is moved to another service area, a signal which can be delivered in that service area can be received.

On the other hand, according to the vehicle antitheft device (8), the service area where the call signal can be received is selected on the basis of the receiving condition in the second reception unit (for example, the frequency with which the best receiving condition can be obtained is selected), and in accordance with the selection, the service area is switched (for example, the receiving frequency is switched) automatically. Thus, even if the vehicle is moved to another service area, a signal which can be delivered in that service area can be received.

Accordingly, when a code showing emergency such as the theft occurrence code can be transmitted to a broad range (for example, service areas throughout the country) over the divisions among the services areas, the theft occurrence code can be received and the stolen vehicle can be switched to the theft occurrence mode even if the vehicle is out of the predetermined service area.

In addition, according to a ninth aspect of the invention, there is provided a vehicle antitheft device (9) having: a second reception unit for receiving a call signal, which includes a call identification information and is transmitted through a public circuit, a fifth judgment unit for judging whether a theft occurrence code, which is set in advance, has been received, based on the call signal, an eighth judgment unit for judging whether a vehicle is out of a service area for reception of the call signal, based on a reception state of the second reception unit, when the fifth judgment unit concludes that the theft occurrence code has been received, and a sixth control unit for making predetermined control on the vehicle when the eighth judgment unit concludes that the vehicle is out of the service area.

According to the vehicle antitheft device (9), when a theft occurrence code transmitted through a public circuit is received and it is concluded on the basis of the second reception unit mounted on the vehicle that the vehicle is out of the service area for receiving the call signal (that is, the receiving condition in the second reception unit suffers conspicuous deterioration), predetermined control (for example, stopping the engine or blinking the lamp) is made on the vehicle.

For example, when the stolen vehicle is out of the service area, the engine of the stolen vehicle can be stopped to prevent the stolen vehicle from being transported far away. Accordingly, even if vehicle theft occurs, the stolen vehicle can be secured in an early stage.

In addition, according to a tenth aspect of the invention, there is provided a vehicle antitheft device (10) having the configuration defined in any one of the vehicle antitheft devices (5) to (9), and further having: a theft occurrence code storage unit for storing the theft occurrence code, and theft occurrence code writing means for writing a code desired by a user into the theft occurrence code storage unit as the theft occurrence code.

According to the vehicle antitheft device (10), when the owner of a vehicle becomes aware of theft of the vehicle, the owner can set any code desired by the owner as the theft occurrence code to be transmitted selectively to the second reception unit mounted on the vehicle. Thus, the owner can memorize the theft occurrence code easily. Accordingly, in case of emergency such as vehicle theft, it is possible to avoid such a perplexity that the theft occurrence code cannot be recalled.

In addition, according to an eleventh aspect of the invention, there is provided a vehicle antitheft device (11) having the configuration defined in any one of the vehicle antitheft devices (5) to (10), and further having: a second confirmation unit for confirming whether a signal to be acquired has been acquired normally, when the fifth judgment unit concludes that the theft occurrence code has been received, and a second processing unit for performing predetermined processing based on a confirmation result obtained by the second confirmation unit.

According to the vehicle antitheft device (11), when it is confirmed whether a signal to be acquired (for example, a signal from the positional information detection unit) has been acquired normally or not during the occurrence of theft of the vehicle, predetermined control (for example, stopping the engine) is made on the basis of the confirmation result thereof.

For example, when a GPS signal cannot be acquired normally (for example, when a GPS antenna has been removed or broken by the thief), the engine is stopped. Thus, the antitheft function can be exerted even if a part of equipment required for antitheft has been removed or broken.

In addition, according to a twelfth aspect of the invention, there is provided a vehicle antitheft device (12) having the configuration defined in any one of the vehicle antitheft devices (5) to (11), and further having: a ninth judgment unit for judging whether a fault diagnosis code, which is set in advance and is transmitted through a public circuit, has been received, fault diagnosis means for performing fault diagnosis when the ninth judgment unit concludes that the fault diagnosis code has been received, and notification means for notifying outside of a diagnosis result obtained by the fault diagnosis means.

According to the vehicle antitheft device (12), when a fault diagnosis code is transmitted through a public circuit, fault diagnosis is carried out on the device, and a notice of the diagnosis result is given to the outside. Accordingly, on the occasion of maintenance of the device, the state of the device can be confirmed without removing the device from the vehicle. Incidentally, as the method for giving a notice to the outside, for example, there is a method for changing the way to blink a hazard lamp in accordance with the fault condition of the device.

In addition, according to a thirteenth aspect of the invention, there is provided a vehicle antitheft device (13) having: a vehicle-specific code storage unit for storing a vehicle-specific code set for each vehicle, a third reception unit for receiving a local signal, which includes the vehicle-specific code and is transmitted locally in a predetermined area, a tenth judgment unit for judging whether the vehicle-specific code stored in the vehicle-specific code storage unit has been received, based on the local signal and the vehicle-specific code stored in the vehicle-specific code storage unit, and a seventh control unit for making predetermined control on the vehicle when the tenth judgment unit concludes that the vehicle-specific code stored in the vehicle-specific code storage unit has been received.

According to the vehicle antitheft device (13), when a vehicle-specific code set for each vehicle in advance and transmitted locally from the second transmitter installed in a predetermined area (for example, a police station, or a place such as a dock where it is highly likely that stolen vehicles are collected for overseas transport) is received, predetermined control (for example, stopping the engine or blinking the lamp) is made on the vehicle.

For example, when the owner of a vehicle becomes aware of theft of the vehicle and uses a closest telephone set, a portable telephone, or the like, to call an antitheft center and make the antitheft center know that his or her vehicle has been stolen, a vehicle-specific code set for the vehicle is transmitted from the antitheft center to the second transmitter so as to make the second transmitter transmit the vehicle-specific code. Thus, when the vehicle enters the dock where the second transmitter is installed, the engine of the vehicle can be stopped, or the lamp thereof can be blinked.

In such a manner, a policeman or the like can find the stolen vehicle easily as well as the stolen vehicle can be prevented from being transported overseas. Accordingly, even if vehicle theft occurs, the stolen vehicle can be secured in an early stage.

In addition, according to a fourteenth aspect of the invention, there is provided a vehicle antitheft device (14) having: a microcomputer having rewritable programs and data; a first interface for outputting a control signal for making predetermined control on a vehicle; a second interface for fetching a signal from a theft occurrence detection unit for detecting occurrence of theft of the vehicle; a third interface for fetching a signal from a positional information detection unit for detecting positional information of the vehicle; a fourth interface for fetching a signal from a second reception unit for receiving a call signal transmitted through a public circuit and including call identification information; and a fifth interface for fetching a signal from a first reception unit for receiving a signal transmitted from a first transmitter installed in a predetermined area for transmitting a signal including a vehicle control code; wherein the microcomputer is equipped with at least one combined unit of: a first combined unit including a first judgment unit defined in the vehicle antitheft device (1) and a first control unit defined in the vehicle antitheft device (1); a second combined unit including a second judgment unit defined in the vehicle antitheft device (2) and a second control unit defined in the vehicle antitheft device (2); a third combined unit including a third judgment unit defined in the vehicle antitheft device (3) and a third control unit defined in the vehicle antitheft device (3); a fourth combined unit including a fifth judgment unit defined in the vehicle antitheft device (5), a sixth judgment unit defined in the vehicle antitheft device (5) and a fourth control unit defined in the vehicle antitheft device (5); a fifth combined unit including a fifth judgment unit defined in the vehicle antitheft device (6), a seventh judgment unit defined in the vehicle antitheft device (6) and a fifth control unit defined in the vehicle antitheft device (6); and a sixth combined unit including a fifth judgment unit defined in the vehicle antitheft device (9), an eighth judgment unit defined in the vehicle antitheft device (9) and a sixth control unit defined in the vehicle antitheft device (9).

According to the vehicle antitheft device (14), the theft occurrence detection unit is connected to the second interface, the positional information detection unit is connected to the third interface, the second reception unit is connected to the fourth interface, and the first reception unit is connected to the fifth interface, so that signals from these units can be received. Accordingly, any one of the vehicle antitheft devices (1), (2), (3), (5), (6) and (9) can be implemented by equipping the microcomputer with any one of the first combined unit, the second combined unit, the third combined unit, the fourth combined unit, the fifth combined unit and the sixth combined unit.

In addition, a combined device of the vehicle antitheft devices (1), (2), (3), (5), (6) and (9) can be implemented by equipping the microcomputer with two or more combined units selected from these first to sixth combined units.

In addition, according to a fifteenth aspect of the invention, there is provided a vehicle antitheft device (15) having: a microcomputer having rewritable programs and data; a first interface for outputting a control signal for making predetermined control on a vehicle; a second interface for fetching a signal from a theft occurrence detection unit for detecting occurrence of theft of the vehicle; a third interface for fetching a signal from a positional information detection unit for detecting positional information of the vehicle; a fourth interface for fetching a signal from a second reception unit for receiving a call signal transmitted through a public circuit and including call identification information; a sixth interface for fetching a signal from a third reception unit for receiving a signal transmitted from a second transmitter installed in a predetermined area for transmitting a signal including a vehicle-specific code; and a vehicle-specific code storage unit for storing a vehicle-specific code set for each vehicle; wherein the microcomputer is equipped with at least one combined unit of: a first combined unit including a first judgment unit defined in the vehicle antitheft device (1) and a first control unit defined in the vehicle antitheft device (1); a third combined unit including a third judgment unit defined in the vehicle antitheft device (3) and a third control unit defined in the vehicle antitheft device (3); a fifth combined unit including a fifth judgment unit defined in the vehicle antitheft device (6), a seventh judgment unit defined in the vehicle antitheft device (6) and a fifth control unit defined in the vehicle antitheft device (6); a sixth combined unit including a fifth judgment unit defined in the vehicle antitheft device (9), an eighth judgment unit defined in the vehicle antitheft device (9) and a sixth control unit defined in the vehicle antitheft device (9); and a seventh combined unit including a tenth judgment unit defined in the vehicle antitheft device (13) and a seventh control unit defined in the vehicle antitheft device (13).

According to the vehicle antitheft device (15), the theft occurrence detection unit is connected to the second interface, the positional information detection unit is connected to the third interface, the second reception unit is connected to the fourth interface, and the third reception unit is connected to the sixth interface, so that signals from these units can be received. Accordingly, any one of the vehicle antitheft devices (1), (3), (6), (9) and (13) can be implemented by equipping the microcomputer with any one of the first combined unit, the third combined unit, the fifth combined unit, the sixth combined unit and the seventh combined unit.

In addition, a combined device of the vehicle antitheft devices (1), (3), (6), (9) and (13) can be implemented by equipping the microcomputer with two or more combined units selected from these first, third and fifth to seventh combined units.

In addition, according to a sixteenth aspect of the invention, there is provided a vehicle antitheft device (16) having the configuration defined in any one of the vehicle antitheft devices (1) to (15), wherein: the predetermined control carried out by any one of the first to seventh control units includes stopping of the vehicle; and the stopping of the vehicle is done in a desired position based on running positional information of the vehicle calculated by a navigation system.

In order to prevent a stolen vehicle from being transported overseas or to find and secure the stolen vehicle in an early stage, the method for stopping the stolen vehicle is indeed very effective. However, it may bring people in the surroundings in danger if the vehicle is stopped anywhere without selection.

According to the vehicle antitheft device (16), a vehicle can be stopped on the basis of running positional information of the vehicle calculated by a navigation system. Accordingly, for example, it is possible to avoid occurrence of such a situation that the vehicle is stopped in an intersection, a sharp curve, a narrow road, or the like.

In addition, according to a seventeenth aspect of the invention, there is provided a vehicle antitheft device (17) having the configuration defined in any one of the vehicle antitheft devices (1) to (16), wherein: the predetermined control carried out by any one of the first to seventh control units includes stopping of the vehicle; and the stopping of the vehicle is to stop the vehicle based on a signal from a vehicle speed detection unit for detecting speed of the vehicle.

In order to prevent a stolen vehicle from being transported overseas or to find and secure the stolen vehicle in an early stage, the method for stopping the stolen vehicle is indeed very effective. However, it may bring people in the surroundings in danger if the vehicle is stopped in a fixed manner taking no account of the vehicle speed of the stolen vehicle.

For example, as for the method for stopping a vehicle, there is a method for blocking the fuel supply to a fuel pump. On this occasion, how to block the fuel supply is preferably changed between when the vehicle speed is 80 km/h and when the vehicle speed is 30 km/h. According to the vehicle antitheft device (17), the vehicle is stopped in consideration of the vehicle speed. Thus, it is possible to avoid such a situation that the stop of the stolen vehicle may bring the people in the surroundings in danger.

In addition, according to a eighteenth aspect of the invention, there is provided a vehicle antitheft system (1) having: a first transmitter for a vehicle antitheft device (2) defined above; and the vehicle antitheft device (2), the first transmitter including: a first transmission unit for locally transmitting a vehicle control code of the vehicle antitheft device (2).

In addition, according to a nineteenth aspect of the invention, there is provided a vehicle antitheft system (2) having: a first transmitter for a vehicle antitheft device (5) defined above; and the vehicle antitheft device (5), the first transmitter including: a second transmission unit for locally transmitting a vehicle control code of the vehicle antitheft device (5).

According to the vehicle antitheft system (1) or (2), when a vehicle control code transmitted locally from the first transmitter installed in a predetermined area (for example, a police station, or a place such as a dock where it is highly likely that stolen vehicles are collected for overseas transport) is received during the occurrence of theft of the vehicle, predetermined control (for example, stopping the engine or blinking the lamp) is made on the vehicle.

For example, if the first transmitter is installed beforehand in a dock where it is highly likely that stolen vehicles are collected, the engine of a stolen vehicle can be stopped or the lamp thereof can be blinked when the stolen vehicle enters the dock.

Thus, a policeman or the like can find the stolen vehicle easily as well as the stolen vehicle can be prevented from being transported overseas. Accordingly, even if vehicle theft occurs, the stolen vehicle can be secured in an early stage.

In addition, according to twentieth aspect of the invention, there is provided a vehicle antitheft system (3) having: a second transmitter for a vehicle antitheft device (13) defined above; and the vehicle antitheft device (13), the second transmitter including: a vehicle-specific code save unit for saving a vehicle-specific code; a fourth reception unit for receiving a vehicle-specific code transmitted from the outside; a storage unit for storing the vehicle-specific code received by the fourth reception unit into the vehicle-specific code save unit; and a third transmission unit for locally transmitting the vehicle-specific code saved in the vehicle-specific code save unit.

According to the vehicle antitheft system (3), when a vehicle-specific code set for each vehicle in advance and transmitted locally from the second transmitter installed in a predetermined area (for example, a police station, or a place such as a dock where it is highly likely that stolen vehicles are collected for overseas transport) is received, predetermined control (for example, stopping the engine or blinking the lamp) is made on the vehicle.

In addition, the second transmitter is designed to save a vehicle-specific code transmitted from the outside and to locally transmit the saved vehicle-specific code. Accordingly, for example, when the owner of a vehicle becomes aware of theft of the vehicle and uses a closest telephone set, a portable telephone, or the like, to call an antitheft center and make the antitheft center know that his or her vehicle has been stolen, a vehicle-specific code set for the vehicle is transmitted from the antitheft center to the second transmitter so as to make the second transmitter transmit the vehicle-specific code.

Accordingly, when the vehicle enters the dock where the second transmitter is installed, the engine of the vehicle can be stopped, or the lamp thereof can be blinked. Thus, a policeman or the like can find the stolen vehicle easily as well as the stolen vehicle can be prevented from being transported overseas. Accordingly, even if vehicle theft occurs, the stolen vehicle can be secured in an early stage.

DETAILED DESCRIPTION OF THE PREFERRED EMBODIMENTS

Embodiments of vehicle antitheft devices and vehicle antitheft systems according to the invention will be described below with reference to the drawings.

Figure 1:
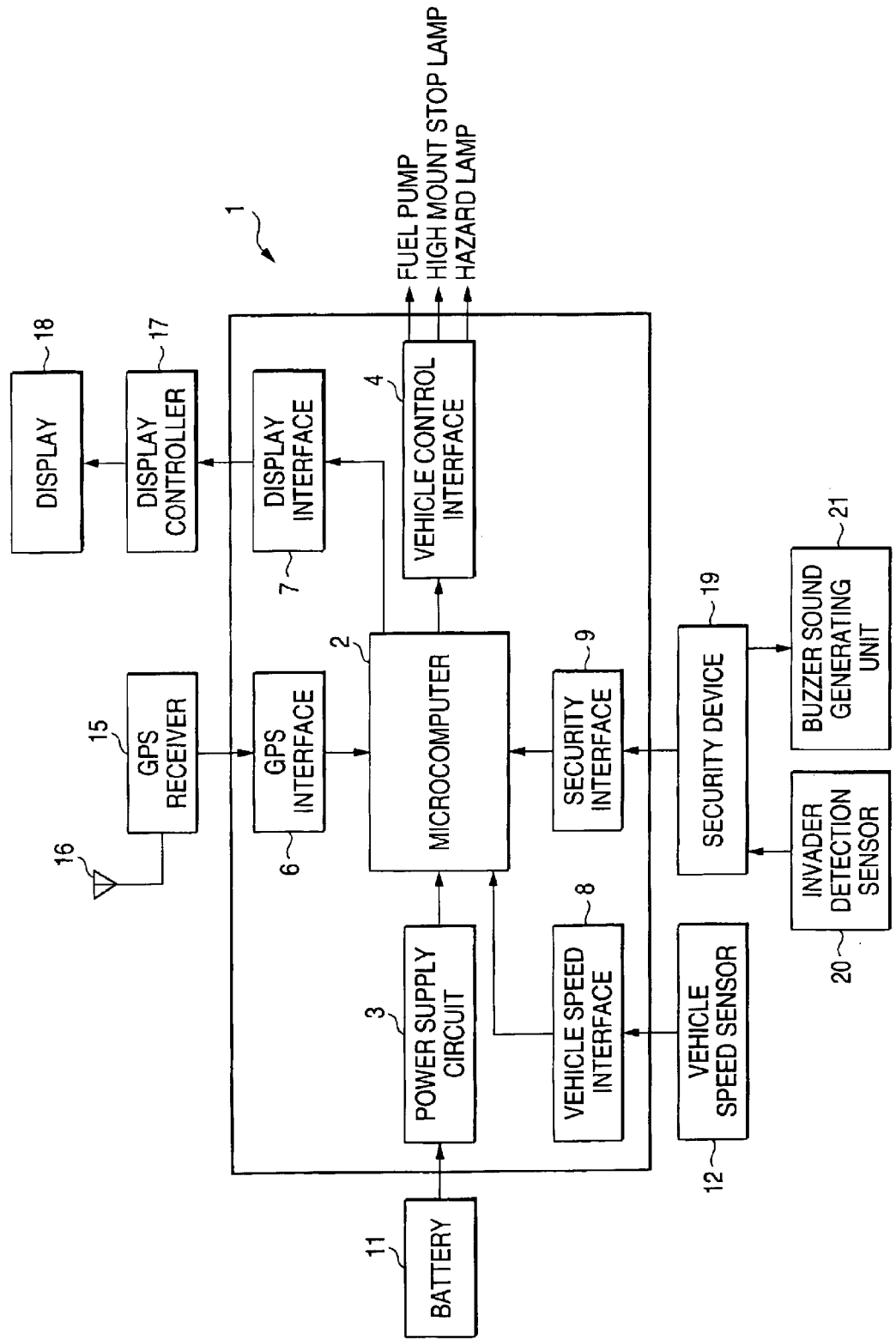
FIG. 1 is a block diagram schematically showing the main portion of a vehicle antitheft device according to an embodiment (1) of the invention.

FIG. 1 is a block diagram schematically showing the main portion of a vehicle antitheft device according to an embodiment (1) of the invention. The reference numeral 1 in FIG. 1 represents a vehicle antitheft device. The vehicle antitheft device 1 includes a microcomputer 2, a power supply circuit 3, a vehicle control interface 4, a GPS interface 6, a display interface 7, a vehicle speed interface 8 and a security interface 9. A battery 11 is connected to the power supply circuit 3, through which power is supplied to the microcomputer 2. GPS signals received by a GPS receiver 15 are inputted through the GPS interface 6. The display interface 7 is connected to a display controller 17. A vehicle speed sensor 12 for detecting the vehicle speed is connected to the vehicle speed interface 8. A security device 19 is connected to the security interface 9, through which a theft occurrence signal is fetched from the security device 19.

The GPS receiver 15 receives GPS signals transmitted from satellites through an antenna 16. The display controller 17 displays predetermined image information on a display 18 in accordance with an instruction given by the microcomputer 2. In addition, the security device 19 controls a buzzer sound generating unit 21 to generate a buzzer sound and outputs a theft occurrence signal to the outside when an invader is detected by an invader detection sensor 20 provided for detecting an invader invading the vehicle.

Next, the processing operation (1) to be executed by the microcomputer 2 in the vehicle antitheft device 1 according to the embodiment (1) will be described with reference to the flow chart shown in FIG. 2. First, it is judged whether a flag f indicating occurrence of vehicle theft is 1 or not (Step S1). When it is concluded that the flag f is not 1, that is, the vehicle is not in a theft occurrence mode, it is judged whether a theft occurrence signal supplied from the security device 19 has been inputted or not (Step S2).

When it is concluded that the theft occurrence signal has not been inputted, the processing operation (1) is terminated as it is. On the contrary, when it is concluded that the theft occurrence signal has been inputted, the flag f is set at 1 (Step S3). Next, GPS signals indicating positional information are acquired (Step S4), and it is judged whether the vehicle is near a predetermined police station or not, based on the GPS signals (Step S5).

When it is concluded that the vehicle is not near the police station, the processing operation (1) is terminated as it is. On the contrary, when it is concluded that the vehicle is near the police station, a high mount stop lamp and a hazard lamp are blinked through the vehicle control interface 4 so as to notify people in the surroundings that the vehicle is a stolen vehicle (Step S6).

Next, a vehicle speed v is acquired (Step S7), and it is judged whether the vehicle speed v is 0 or not (Step S8). When it is concluded that the vehicle speed v is 0, a fuel pump is blocked through the vehicle control interface 4 so as to stop the fuel supply (Step S9). On the contrary, when it is concluded that the vehicle speed v is not 0, the display controller 17 is controlled through the display interface 7 so that a message "This stolen vehicle will be forcibly stopped soon." is displayed on the display 18 (Step S10). Next, the fuel pump is blocked stepwise in accordance with the vehicle speed v through the vehicle control interface 4 (Step S11).

For example, when the vehicle speed is not lower than 80 km/h, blocking time is set at 1 second for every 5 seconds of fuel supply time to the fuel pump so that the speed is reduced gradually. When the vehicle speed becomes not higher than 60 km/h, the blocking time is set at 4 seconds for every 2 seconds of the fuel supply time. When the vehicle speed becomes not higher than 40 km/h, the blocking time is set at 10 seconds for every 1 second of the fuel supply time. Then, when the vehicle speed becomes not higher than 20 km/h, the fuel supply is blocked entirely.

On the other hand, when it is concluded in Step S1 that the flag f is 1, that is, the vehicle has been already in the theft occurrence mode, the processing operation skips Steps S2 and S3 and advances to Step S4.

According to the vehicle antitheft device according to the embodiment (1), when it is judged that the vehicle is near a police station during occurrence of theft of the vehicle (that is, the vehicle is in the theft occurrence mode), the vehicle is controlled to stop its engine or blink its lamp so that a police can find the stolen vehicle easily. Thus, even if vehicle theft occurs, the stolen vehicle can be secured in an early stage.

Figure 3:
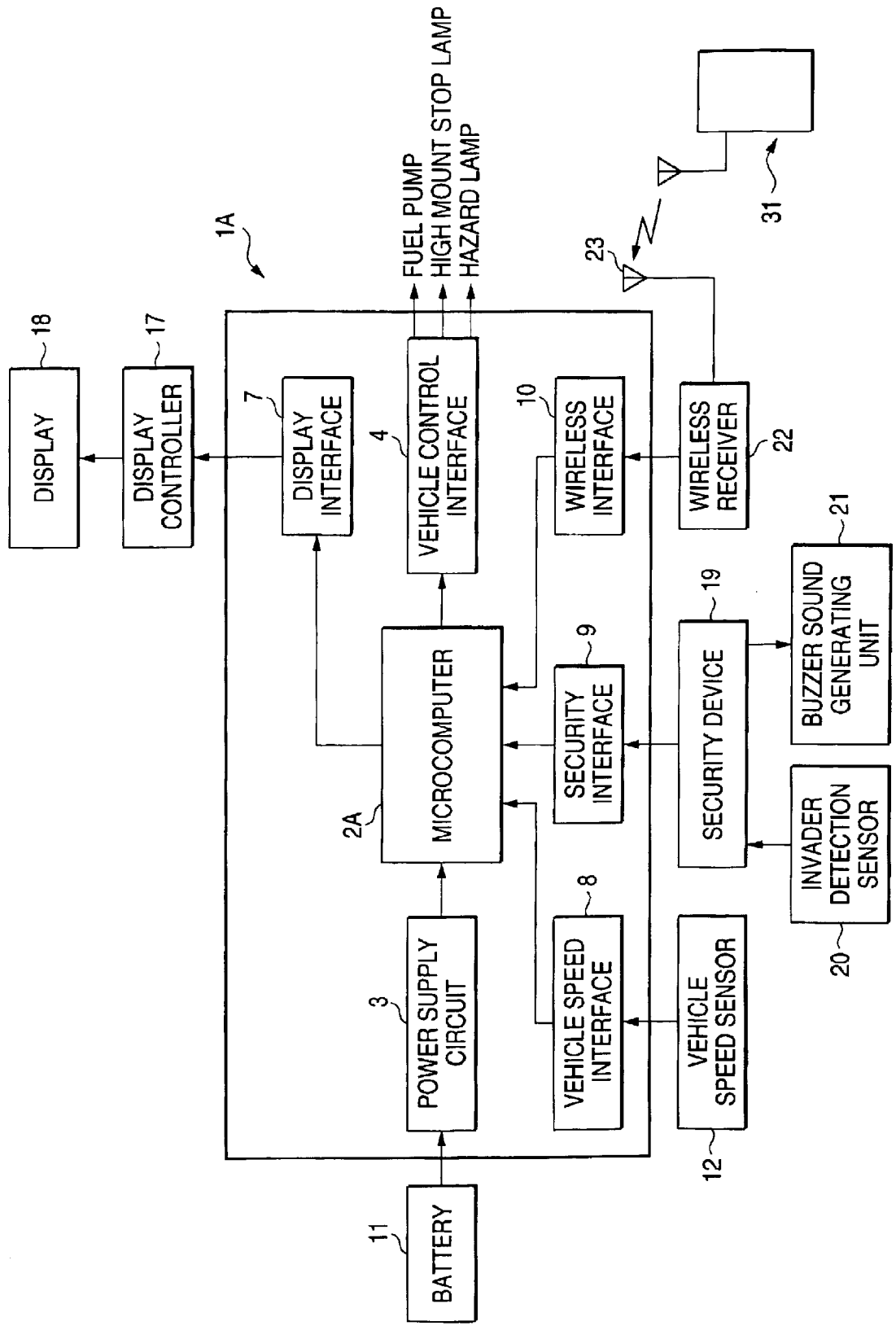
FIG. 3 is a block diagram schematically showing the main portion of a vehicle antitheft system formed to include a vehicle antitheft device according to an embodiment (2) of the invention.

FIG. 3 is a block diagram schematically showing the main portion of a vehicle antitheft system formed to include a vehicle antitheft device according to an embodiment (2) of the invention. The vehicle antitheft system includes a vehicle antitheft device 1A and a wireless transmitter 31, which is installed in a dock where it is highly likely that stolen vehicles are transported overseas. Incidentally, constituent parts the same as those in the vehicle antitheft device shown in FIG. 1 are denoted by the same numerals, and description thereof will be omitted.

The vehicle antitheft device 1A includes a microcomputer 2A, a power supply circuit 3, a vehicle control interface 4, a display interface 7, a vehicle speed interface 8, a security interface 9 and a wireless interface 10. A battery 11 is connected to the power supply circuit 3, through which power is supplied to the microcomputer 2A. A signal received by a wireless receiver 22 is inputted through the wireless interface 10.

Through an antenna 23, the wireless receiver 22 receives a signal including a vehicle control code and transmitted from the wireless transmitter 31 locally (for example, with power intensity high enough to reach a range with a radius of 50 m).

Figure 4:
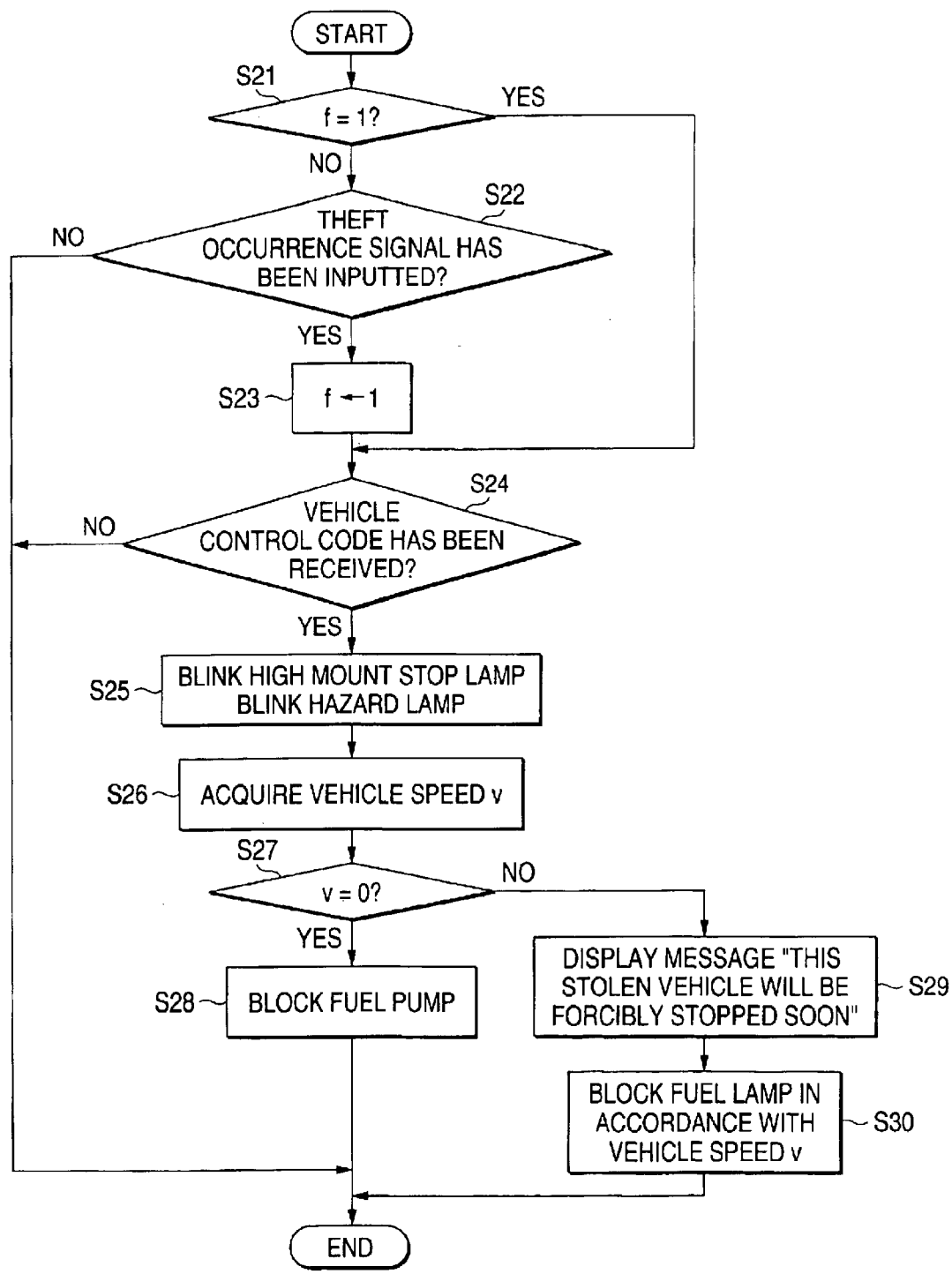
FIG. 4 is a flow chart showing the processing operation to be executed by a microcomputer in the vehicle antitheft device according to the embodiment (2).

Next, the processing operation (2) to be executed by the microcomputer 2A in the vehicle antitheft device 1A according to the embodiment (2) will be described with reference to the flow chart shown in FIG. 4. First, it is judged whether a flag f indicating occurrence of vehicle theft is 1 or not (Step S21). When it is concluded that the flag f is not 1, that is, the vehicle is not in a theft occurrence mode, it is judged whether a theft occurrence signal supplied from a security device 19 has been inputted or not (Step S22).

When it is concluded that the theft occurrence signal has not been inputted, the processing operation (2) is terminated as it is. On the contrary, when it is concluded that the theft occurrence signal has been inputted, the flag f is set at 1 (Step S23). Next, it is judged whether a vehicle control code transmitted from the wireless transmitter 31 has been received or not (Step S24).

When it is concluded that the vehicle control code has not been received, the processing operation (2) is terminated as it is. On the contrary, when it is concluded that the vehicle control code has been received, a high mount stop lamp and a hazard lamp are blinked through the vehicle control interface 4 so as to notify people in the surroundings that the vehicle is a stolen vehicle (Step S25).

Next, a vehicle speed v is acquired (Step S26), and it is judged whether the vehicle speed v is 0 or not (Step S27). When it is concluded that the vehicle speed v is 0, a fuel pump is blocked through the vehicle control interface 4 so as to stop the fuel supply (Step S28). On the contrary, when it is concluded that the vehicle speed v is not 0, a display controller 17 is controlled through the display interface 7 so that a message "This stolen vehicle will be forcibly stopped soon." is displayed on a display 18 (Step S29). Next, the fuel pump is blocked stepwise in accordance with the vehicle speed v through the vehicle control interface 4 (Step S30).

On the other hand, when it is concluded in Step S21 that the flag f is 1, that is, the vehicle has been already in the theft occurrence mode, the processing operation skips Steps S22 and S23 and advances to Step S24.

According to the vehicle antitheft device according to the embodiment (2), when the vehicle control code transmitted locally by the wireless transmitter 31 installed in a dock where it is highly likely that stolen vehicles are collected for overseas transport is received during occurrence of theft of the vehicle (that is, the vehicle is in the theft occurrence mode), the vehicle is controlled to stop its engine or blink its lamp so that a police or the like can find the stolen vehicle easily as well as the stolen vehicle can be prevented from being transported overseas. Thus, even if vehicle theft occurs, the stolen vehicle can be secured in an early stage.

Figure 5:
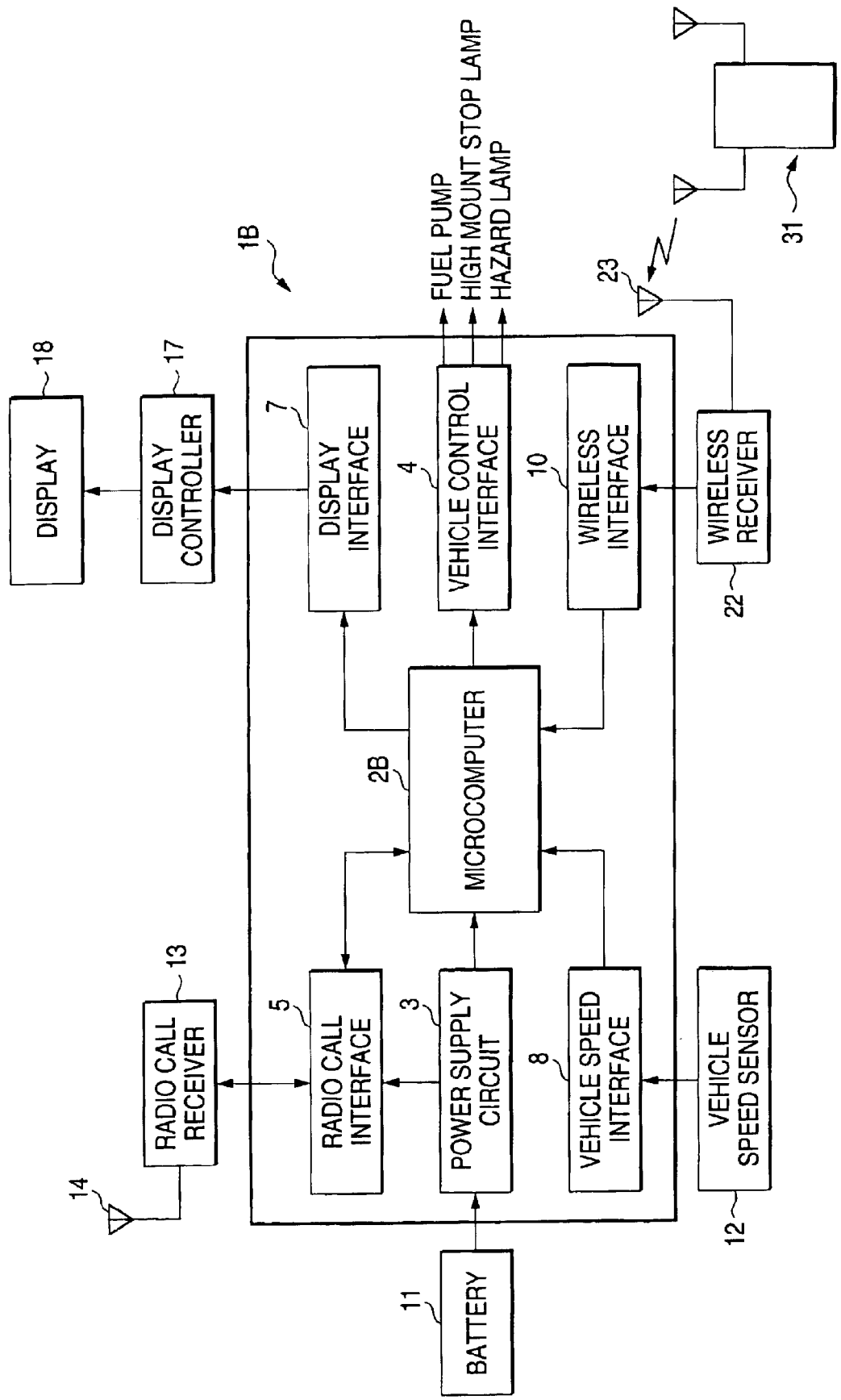
FIG. 5 is a block diagram schematically showing the main portion of a vehicle antitheft system formed to include a vehicle antitheft device according to an embodiment (3) of the invention.

FIG. 5 is a block diagram schematically showing the main portion of a vehicle antitheft system formed to include a vehicle antitheft device according to an embodiment (3) of the invention. The vehicle antitheft system includes a vehicle antitheft device 1B and a wireless transmitter 31, which is installed in a dock where it is highly likely that stolen vehicles are transported overseas. Incidentally, constituent parts the same as those in the vehicle antitheft devices shown in FIGS. 1 and 3 are denoted by the same numerals, and description thereof will be omitted.

The vehicle antitheft device 1B includes a microcomputer 2B, a power supply circuit 3, a vehicle control interface 4, a radio call interface 5, a display interface 7, a vehicle speed interface 8 and a wireless interface 10. A battery 11 is connected to the power supply circuit 3, through which power is supplied to the microcomputer 2B and a radio call receiver 13 which will be described later. A signal received by the radio call receiver 13 is inputted through the radio call interface 5.

The radio call receiver 13 is a so-called pager terminal for receiving a call signal through an antenna 14. The call signal includes call identification information and is transmitted through a public circuit.

Figure 6:
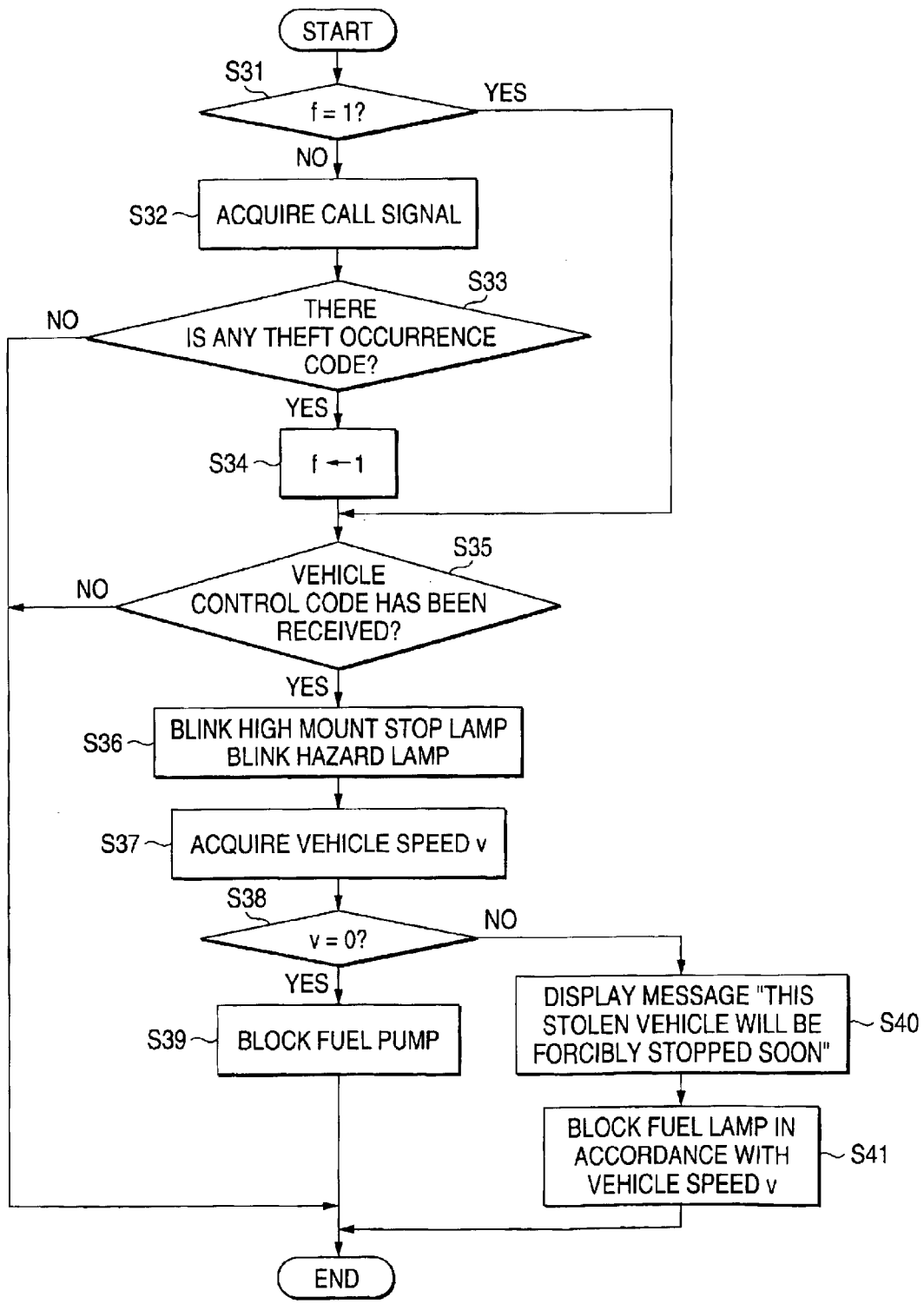
FIG. 6 is a flow chart showing the processing operation to be executed by a microcomputer in the vehicle antitheft device according to the embodiment (3).

Next, the processing operation (3) to be executed by the microcomputer 2B in the vehicle antitheft device 1B according to the embodiment (3) will be described with reference to the flow chart shown in FIG. 6. First, it is judged whether a flag f indicating occurrence of vehicle theft is 1 or not (Step S31). When it is concluded that the flag f is not 1, that is, the vehicle is not in a theft occurrence mode, a call signal received by the radio call receiver 13 is acquired (Step S32), and it is judged whether a theft occurrence code set in advance is included in the acquired call signal or not (Step S33).

When it is concluded that the theft occurrence code is not included, the processing operation (3) is terminated as it is. On the contrary, when it is concluded that the theft occurrence code is included, the flag f is set at 1 (Step S34), and it is then judged whether a vehicle control code transmitted from the wireless transmitter 31 has been received or not (Step S35).

When it is concluded that the vehicle control code has not been received, the processing operation (3) is terminated as it is. On the contrary, when it is concluded that the vehicle control code has been received, a high mount stop lamp and a hazard lamp are blinked through the vehicle control interface 4 so as to notify people in the surroundings that the vehicle is a stolen vehicle (Step S36).

Next, a vehicle speed v is acquired (Step S37), and it is judged whether the vehicle speed v is 0 or not (Step S38). When it is concluded that the vehicle speed v is 0, a fuel pump is blocked through the vehicle control interface 4 so as to stop the fuel supply (Step S39). On the contrary, when it is concluded that the vehicle speed v is not 0, a display controller 17 is controlled through the display interface 7 so that a message "This stolen vehicle will be forcibly stopped soon." is displayed on a display 18 (Step S40). Next, the fuel pump is blocked stepwise in accordance with the vehicle speed v through the vehicle control interface 4 (Step S41).

On the other hand, when it is concluded in Step S31 that the flag f is 1, that is, the vehicle has been already in the theft occurrence mode, the processing operation skips Steps S32 to S34 and advances to Step S35.

According to the vehicle antitheft device according to the embodiment (3), when the owner of a vehicle becomes aware of theft of the vehicle and uses a closest telephone set, a portable telephone, or the like, to transmit the theft occurrence code selectively to the radio call receiver 13 mounted on the vehicle, it is possible to bring the vehicle into the theft occurrence mode.

Further, when the vehicle control code transmitted locally from the wireless transmitter 31 installed in a dock where it is highly likely that stolen vehicles are collected for overseas transport is received in the condition that the vehicle is in the theft occurrence mode, the vehicle is controlled to stop its engine or blink its lamp so that a police or the like can find the stolen vehicle easily as well as the stolen vehicle can be prevented from being transported overseas. Thus, even if vehicle theft occurs, the stolen vehicle can be secured in an early stage.

Figure 7:
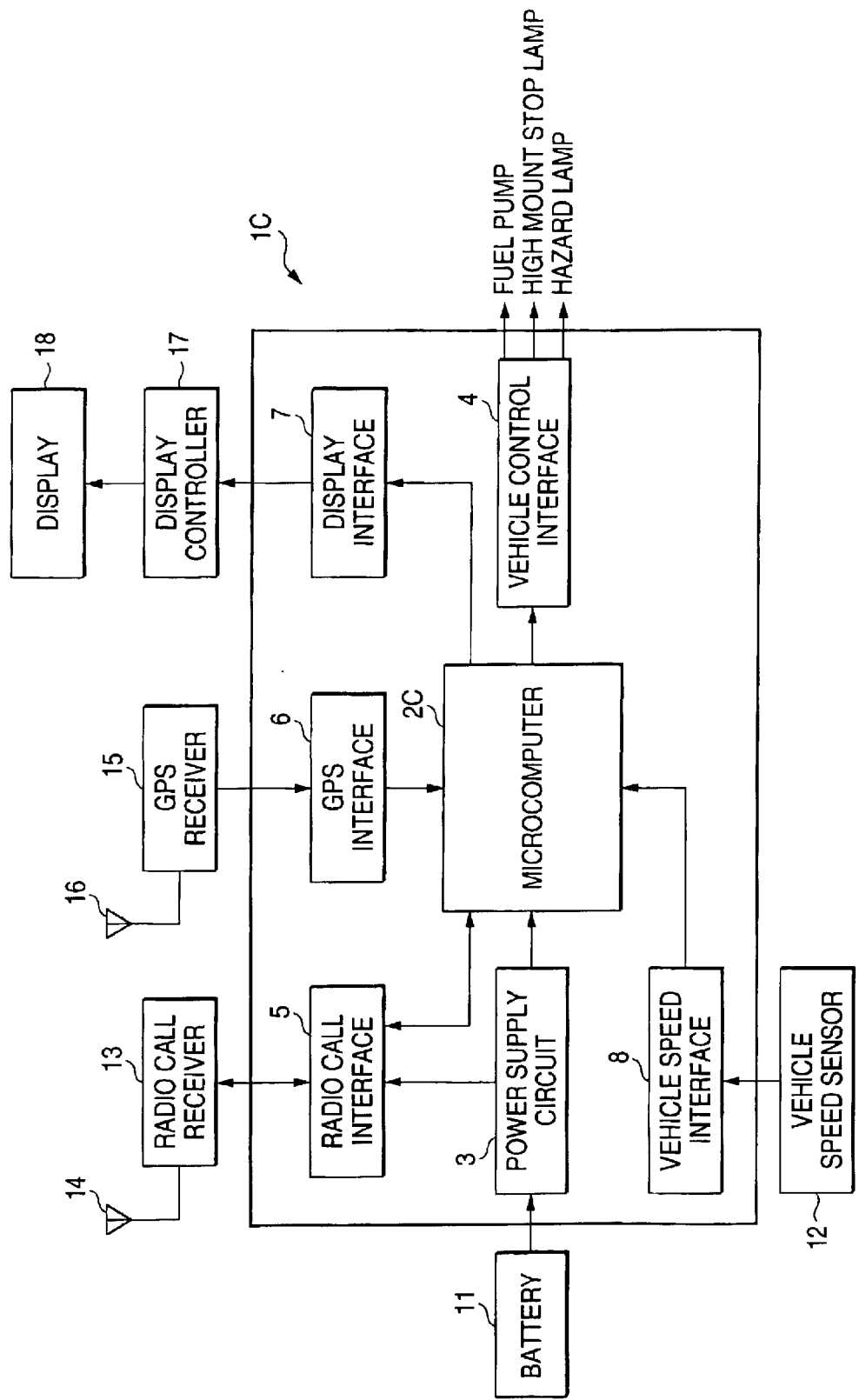
FIG. 7 is a block diagram schematically showing the main portion of a vehicle antitheft device according to an embodiment (4) of the invention.

FIG. 7 is a block diagram schematically showing the main portion of a vehicle antitheft device according to an embodiment (4) of the invention. Incidentally, constituent parts the same as those in the vehicle antitheft devices shown in FIGS. 1, 3 and 5 are denoted by the same numerals, and description thereof will be omitted. In FIG. 7, the reference numeral 1C represents a vehicle antitheft device. The vehicle antitheft device 1C includes a microcomputer 2C, a power supply circuit 3, a vehicle control interface 4, a radio call interface 5, a GPS interface 6, a display interface 7 and a vehicle speed interface 8. A battery 11 is connected to the power supply circuit 3, through which power is supplied to the microcomputer 2C and a radio call receiver 13. A signal received by the radio call receiver 13 is inputted through the radio call interface 5.

Figure 8:
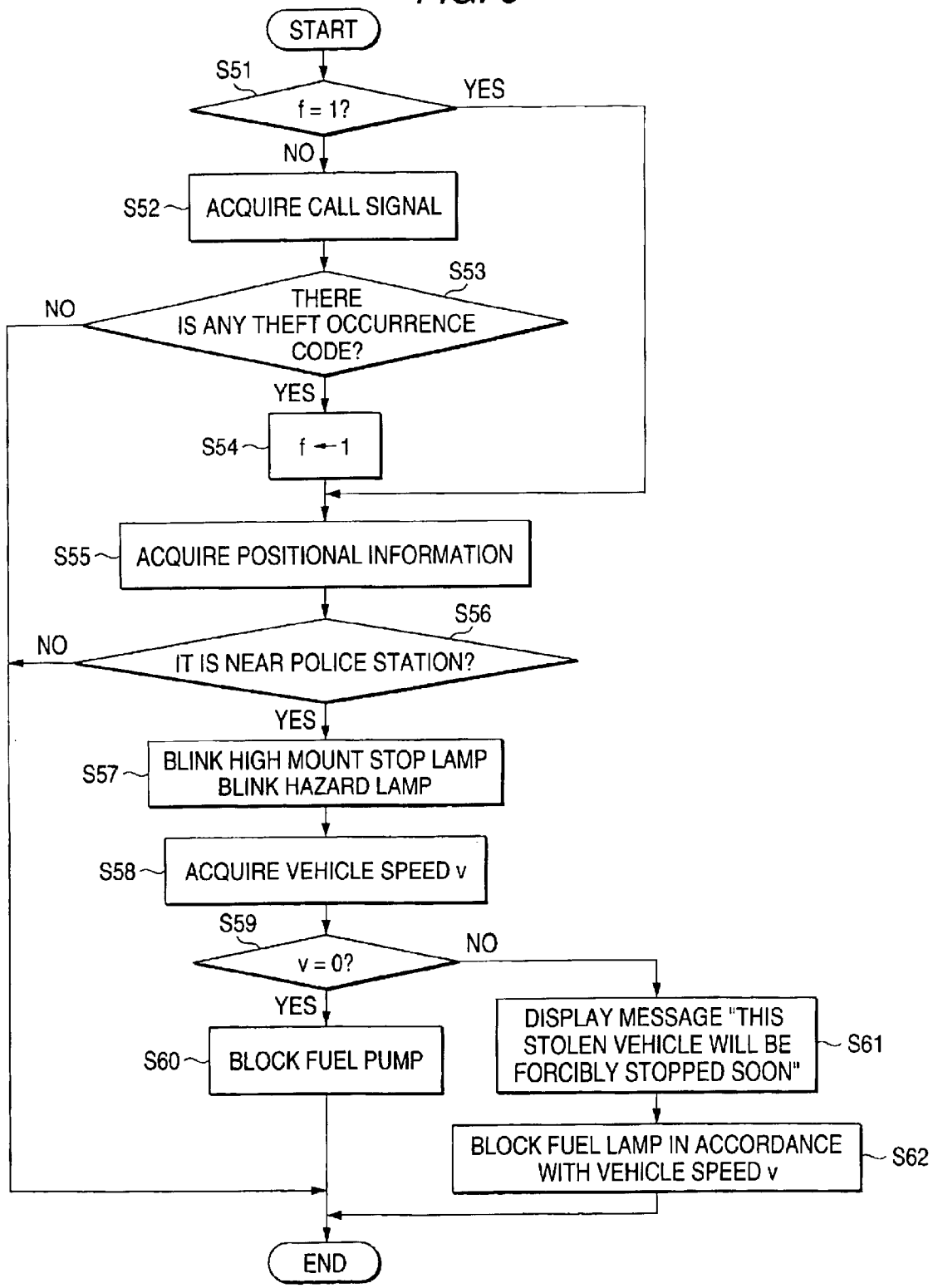
FIG. 8 is a flow chart showing the processing operation to be executed by a microcomputer in the vehicle antitheft device according to the embodiment (4).

Next, the processing operation (4) to be executed by the microcomputer 2C in the vehicle antitheft device according to the embodiment (4) will be described with reference to the flow chart shown in FIG. 8. First, it is judged whether a flag f indicating occurrence of vehicle theft is 1 or not (Step S51). When it is concluded that the flag f is not 1, that is, the vehicle is not in a theft occurrence mode, a call signal received by the radio call receiver 13 is acquired (Step S52), and it is judged whether a theft occurrence code set in advance is included in the acquired call signal or not (Step S53).

When it is concluded that the theft occurrence code is not included, the processing operation (4) is terminated as it is. On the contrary, when it is concluded that the theft occurrence code is included, the flag f is set at 1 (Step S54). Next, GPS signals indicating positional information are acquired (Step S55), and it is judged whether the vehicle is near a predetermined police station or not on the basis of the GPS signals (Step S56).

When it is concluded that the vehicle is not near the police station, the processing operation (4) is terminated as it is. On the contrary, when it is concluded that the vehicle is near the police station, a high mount stop lamp and a hazard lamp are blinked through the vehicle control interface 4 so as to notify people in the surroundings that the vehicle is a stolen vehicle (Step S57).

Next, a vehicle speed v is acquired (Step S58), and it is judged whether the vehicle speed v is 0 or not (Step S59). When it is concluded that the vehicle speed v is 0, a fuel pump is blocked through the vehicle control interface 4 so as to stop the fuel supply (Step S60). On the contrary, when it is concluded that the vehicle speed vis not 0, a display controller 17 is controlled through the display interface 7 so that a message "This stolen vehicle will be forcibly stopped soon." is displayed on a display 18 (Step S61). Next, the fuel pump is blocked stepwise in accordance with the vehicle speed v through the vehicle control interface 4 (Step S62).

On the other hand, when it is concluded in Step S51 that the flag f is 1, that is, the vehicle has been already in the theft occurrence mode, the processing operation skips Steps S52 to S54 and advances to Step S55.

According to the vehicle antitheft device according to the embodiment (4), when the owner of a vehicle becomes aware of theft of the vehicle and uses a closest telephone set, a portable telephone, or the like, to transmit the theft occurrence code selectively to the radio call receiver 13 mounted on the vehicle, it is possible to bring the vehicle into the theft occurrence mode.

Further, when it is concluded that the vehicle is near the police station in the condition that the vehicle is in the theft occurrence mode, the vehicle is controlled to stop its engine or blink its lamp so that a police can find the stolen vehicle easily. Thus, even if vehicle theft occurs, the stolen vehicle can be secured in an early stage.

The service area where a call signal transmitted through a public circuit and including call identification information can be received is determined in advance on the basis of a contract or the like with a service company. For example, when the vehicle mounted with the radio call receiver 13 for receiving the call signal is out of the predetermined service area, any signal addressed to the radio call receiver 13 cannot be received by the radio call receiver 13.

This is because the signal addressed to the radio call receiver 13 is transmitted only to the predetermined service area (for example, Hyogo Prefecture) but not to any other service area while each service area is divided from the other service areas by available frequency.

Accordingly, even in the case where a code showing emergency such as a theft occurrence code were designed to be transmitted to a broad range (for example, service areas throughout the country) over the divisions among the services areas, the theft occurrence code still could not be received by the radio call receiver 13 if the receiving frequency of the radio call receiver 13 is not tuned up. Thus, the stolen vehicle could not be switched to the theft occurrence mode.

Therefore, in a vehicle antitheft device according to another embodiment, the service area where the call signal can be received may be selected on the basis of signals from the GPS receiver 15, or the service area where the call signal can be received may be selected on the basis of the receiving condition in the radio call receiver 13. Thus, in accordance with the selection, the service area is switched (for example, the receiving frequency is switched) automatically.

In such a manner, even if the vehicle goes out of the predetermined service area and moves to another service area, a signal, which can be delivered in that service area, can be received.

Accordingly, when a code showing emergency such as the theft occurrence code can be transmitted to a broad range (for example, service areas throughout the country) over the divisions among the services areas, the theft occurrence code can be received and the stolen vehicle can be switched to the theft occurrence mode even if the vehicle is out of the predetermined service area.

In addition, the vehicle antitheft device according to the embodiment (3) or (4) does not include the design for making the owner of the vehicle be able to set any desired code as the theft occurrence code to be transmitted through a public circuit by the owner of the vehicle. However, in a vehicle antitheft device according to another embodiment, a nonvolatile memory such as an EEPROM may be provided in the vehicle antitheft device 1B or 1C so that any code desired by the owner of the vehicle can be written as the theft occurrence code into the nonvolatile memory. In such a manner, in case of emergency such as vehicle theft, it is possible to avoid such a perplexity that the owner of the vehicle cannot recall the theft occurrence code.

In addition, in a vehicle antitheft device according to a further embodiment, when the radio call receiver 13 receives a fault diagnosis code (which is, not to say, a code different from the theft occurrence code) set in advance and transmitted through a public circuit, fault diagnosis is carried out on the vehicle antitheft device 1B or 1C. In this case, a high mount stop lamp or a hazard lamp may be blinked on the basis of the result of the fault diagnosis. In such a manner, the state of the vehicle antitheft device 1B or 1C can be confirmed during maintenance without removing the vehicle antitheft device 1B or 1C from the vehicle.

In addition, in the vehicle antitheft devices according to the embodiments (1) to (4), predetermined control will be made on a vehicle if it is concluded that the vehicle is near a police station or the vehicle control code transmitted locally from the wireless transmitter 31 is received in the condition that the vehicle is in the theft occurrence mode. However, in a vehicle antitheft device according to another embodiment, the receiving condition in the radio call receiver 13 can be detected. In this manner, when the receiving condition detected suffers conspicuous deterioration (that is, when the vehicle is out of the service area), the predetermined control may be made on the vehicle.

For example, when a stolen vehicle is out of the service area, the engine of the stolen vehicle is stopped so that the stolen vehicle can be prevented from being transported far away. Thus, even if vehicle theft occurs, the stolen vehicle can be secured in an early stage.

Incidentally, since the receiving condition in the radio call receiver 13 may deteriorate, for example, due to movement in a tunnel though the vehicle is in the predetermined service area, it is desired that the judgment as to whether the receiving condition in the radio call receiver 13 suffers conspicuous deterioration or not is based on a criterion as to whether the receiving condition has been kept to be not higher than a predetermined level for a predetermined period.

Figure 9:
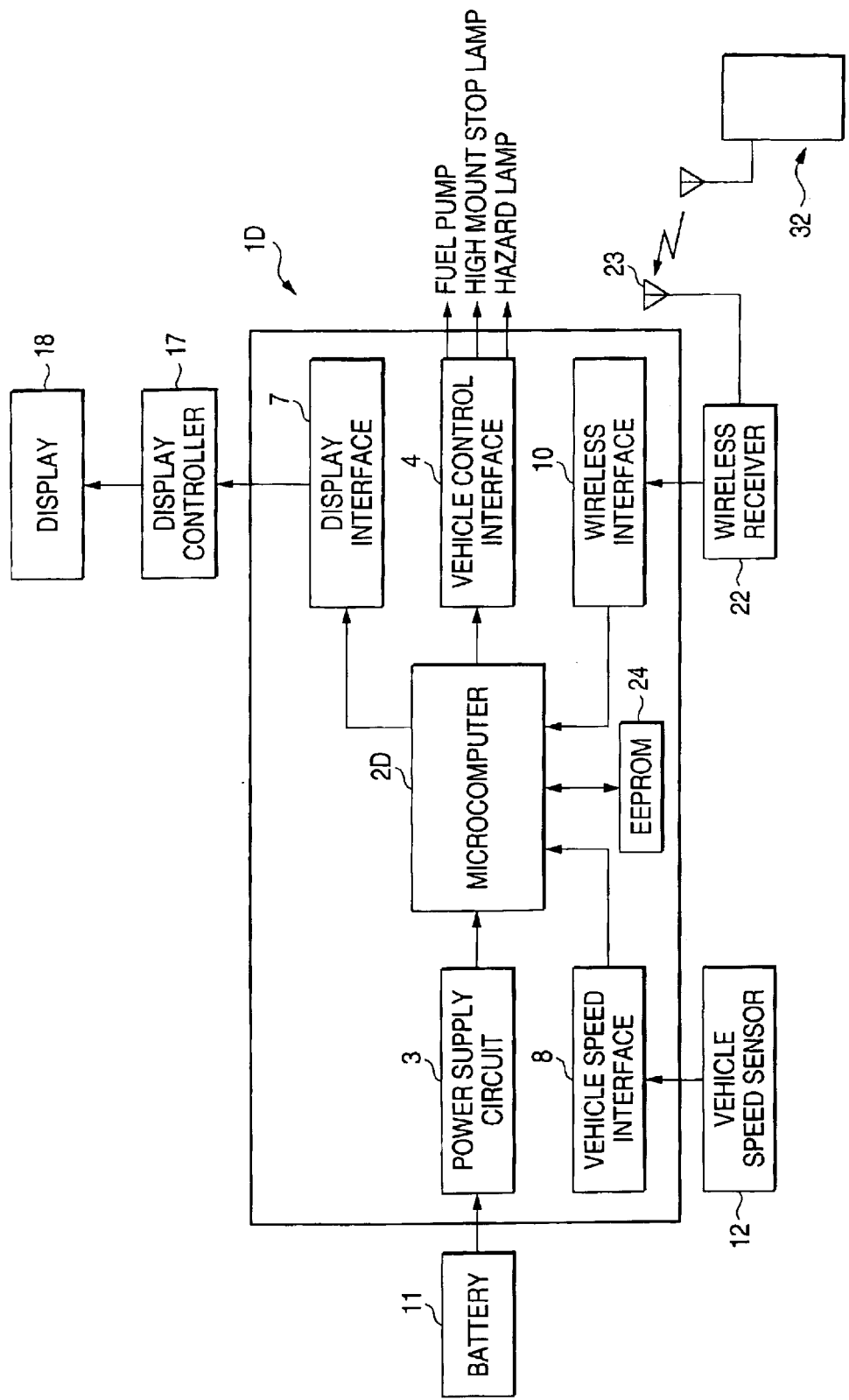
FIG. 9 is a block diagram schematically showing the main portion of a vehicle antitheft system formed to include a vehicle antitheft device according to an embodiment (5) of the invention.

FIG. 9 is a block diagram schematically showing the main portion of a vehicle antitheft system formed to include a vehicle antitheft device according to an embodiment (5) of the invention. The vehicle antitheft system includes a vehicle antitheft device 1D and a wireless transmitter 32, which is installed in a dock where it is highly likely that stolen vehicles are transported overseas. Incidentally, constituent parts the same as those in the vehicle antitheft devices shown in FIGS. 1, 3 and 5 are denoted by the same numerals, and description thereof will be omitted.

The vehicle antitheft device 1D includes a microcomputer 2D, a power supply circuit 3, a vehicle control interface 4, a display interface 7, a vehicle speed interface 8, a wireless interface 10 and an EEPROM 24. A battery 11 is connected to the power supply circuit 3, through which power is supplied to the microcomputer 2D. The EEPROM 24 stores a vehicle-specific code set for each vehicle.

Through an antenna 23, a wireless receiver 22 receives a signal including a vehicle-specific code and transmitted locally (for example, with power intensity high enough to reach a range with a radius of 50 m) from the wireless transmitter 32.

Figure 10:
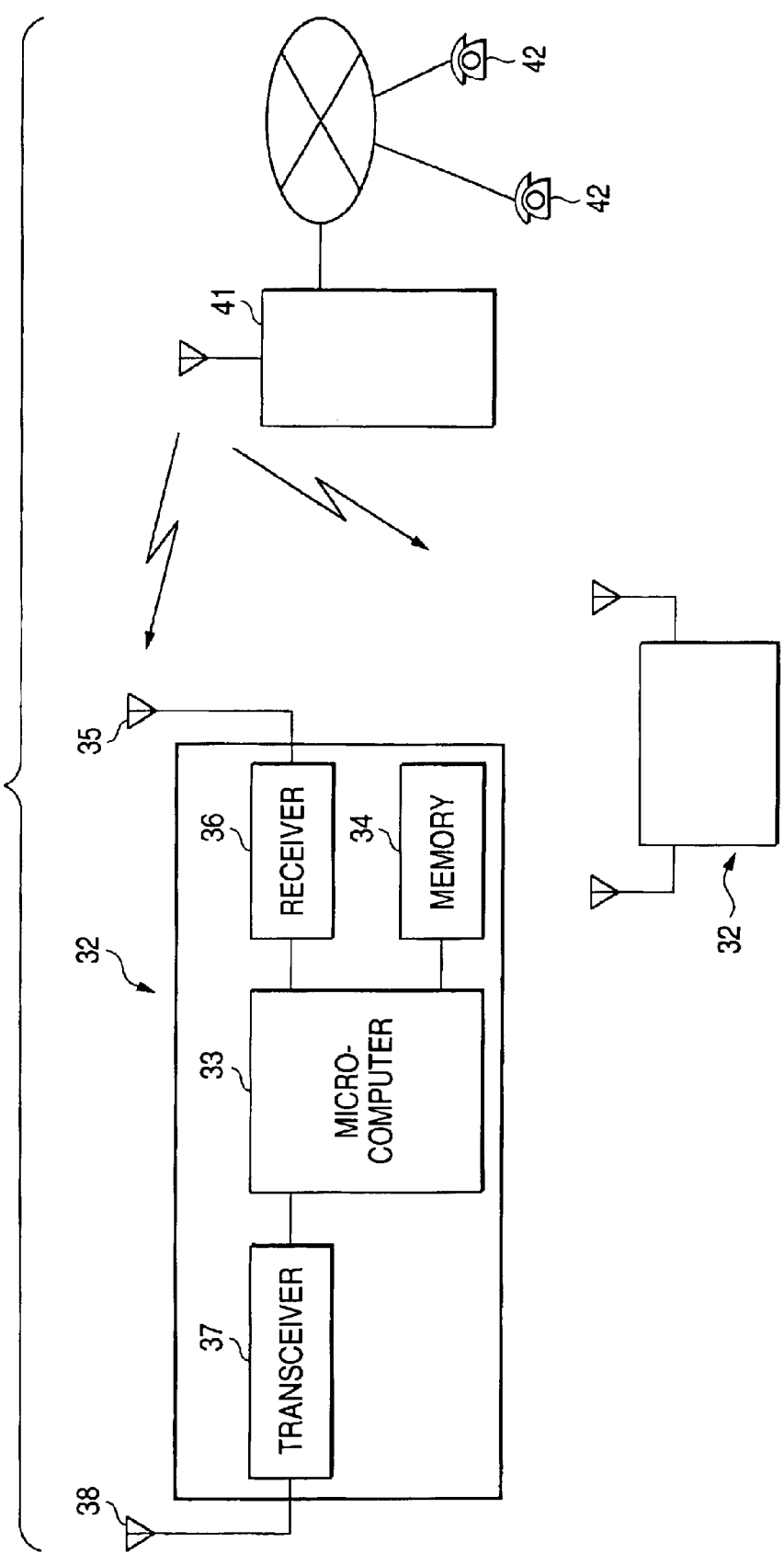
FIG. 10 is a block diagram schematically showing the main portion of a wireless transmitter constituting the vehicle antitheft system shown in FIG. 9.

FIG. 10 is a block diagram schematically showing the main portion of the wireless transmitter constituting the vehicle antitheft system. In FIG. 10, the reference numeral 41 represents an antitheft center. When the antitheft center 41 is notified through a telephone set 42 or the like by the vehicle owner having entered into a contract with the antitheft center 41 that his or her vehicle has been stolen, the antitheft center 41 transmits the wireless transmitter 32 a signal including a vehicle-specific code set for the vehicle.

The wireless transmitter 32 includes a microcomputer 33, a memory 34, an antenna 35, a receiver 36, a transmitter 37 and a antenna 38. The memory 34 stores the vehicle-specific code. The antenna 35 and the receiver 36 receive a signal transmitted from the antitheft center 41 and including the vehicle-specific code. The transmitter 37 and the antenna 38 locally transmit a signal including the vehicle-specific code stored in the memory 34.

Figure 11:
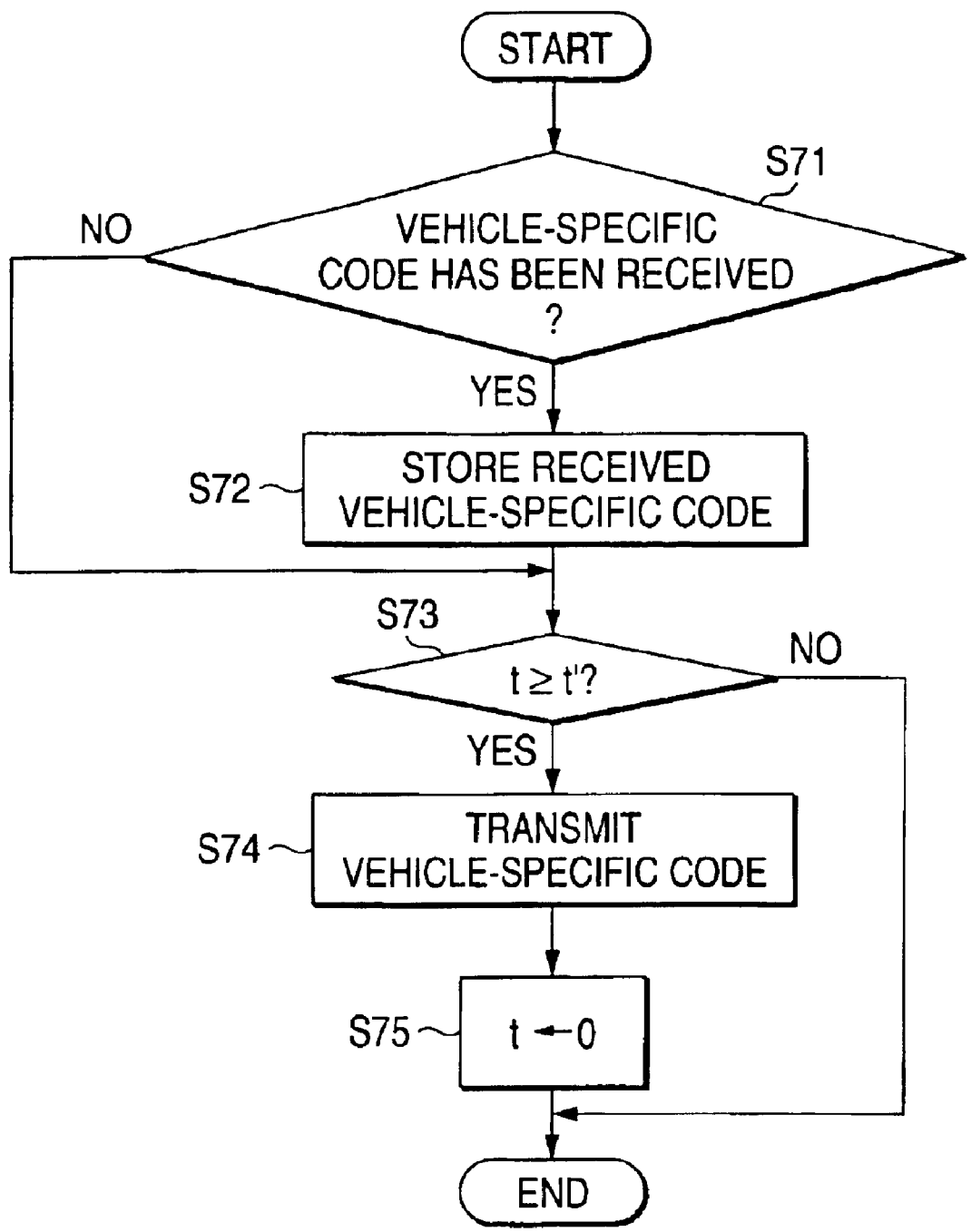
FIG. 11 is a flow chart showing the processing operation to be executed by a microcomputer in the wireless transmitter shown in FIG. 10.

Next, the processing operation (5) to be executed by the microcomputer 33 in the wireless transmitter 32 of the vehicle antitheft system formed to include the vehicle antitheft device according to the embodiment (5) will be described with reference to the flow chart shown in FIG. 11. First, it is judged whether a vehicle-specific code transmitted from the antitheft center 41 has been received or not (Step S71). When it is concluded that the vehicle-specific code has been received, the received vehicle-specific code is stored in the memory 34 (Step S72). Then, the processing operation advances to Step S73.

On the other hand, when it is concluded that the vehicle-specific code has not been received, the processing operation skips Step S72 and advances to Step S73.

In Step S73, it is judged whether a timer t has counted at least a time t' (e.g. 5 seconds) or not. When it is concluded that the timer t has counted at least the time t', the vehicle-specific code stored in the memory 34 is transmitted locally through the transmitter 37 and the antenna 38 (Step S74). After that, the timer t is reset (Step S75). On the other hand, when the timer t has not yet counted the time t', the processing operation (5) is terminated as it is.

Figure 12:
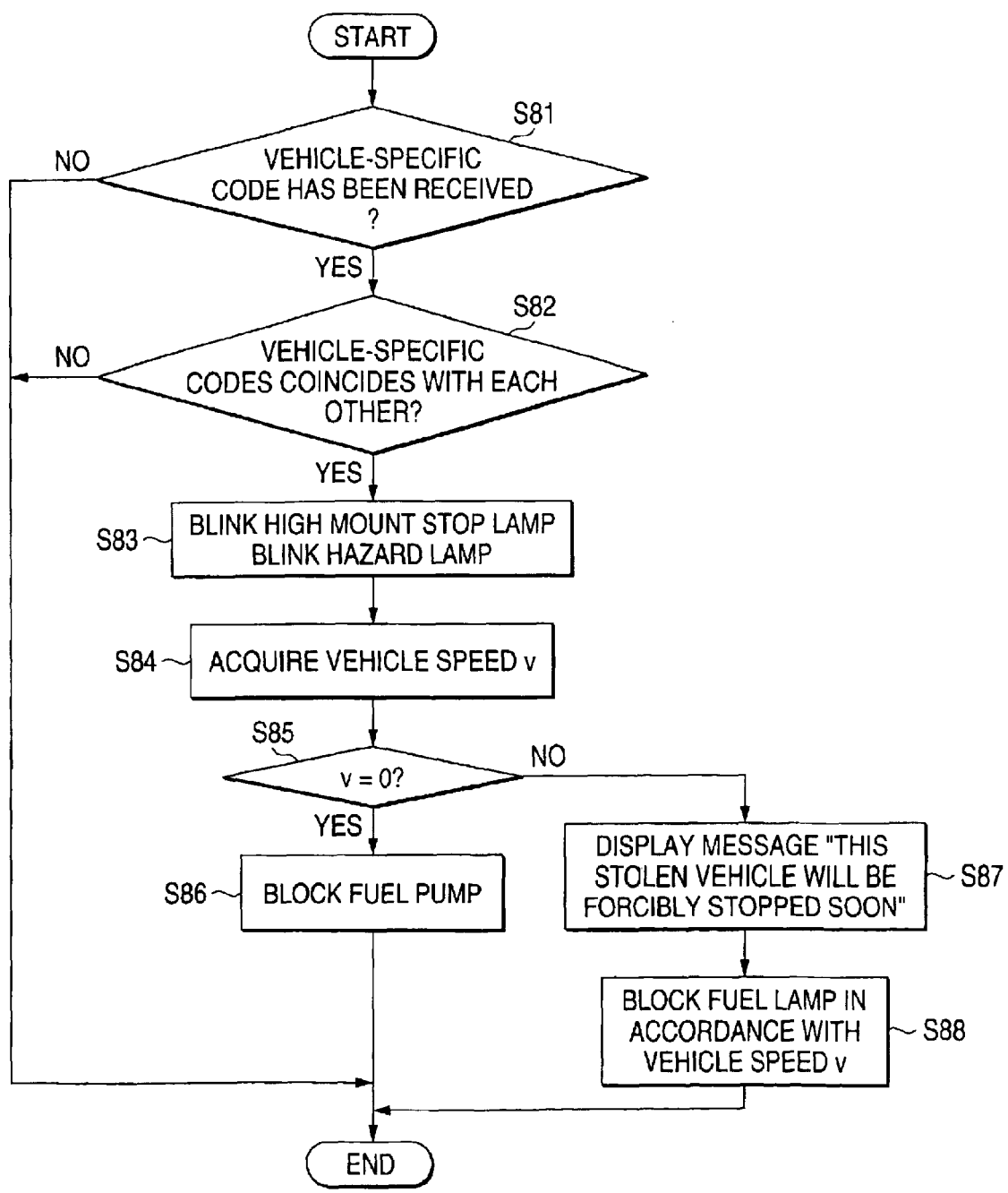
FIG. 12 is a flow chart showing the processing operation to be executed by a microcomputer in the vehicle antitheft device according to the embodiment (5).

Next, the processing operation (6) to be executed by the microcomputer 2D in the vehicle antitheft device 1D according to the embodiment (5) will be described with reference to the flow chart shown in FIG. 12. First, it is judged whether the vehicle-specific code transmitted from the wireless transmitter 32 has been received or not (Step S81). When it is concluded that the vehicle-specific code has been received, it is judged whether the received vehicle-specific code coincides with the vehicle-specific code stored in the EEPROM 24 or not (Step S82).

When it is concluded that these vehicle-specific codes coincide with each other, the vehicle is regarded as a stolen vehicle, and a high mount stop lamp and a hazard lamp are blinked through the vehicle control interface 4 so as to notify people in the surroundings that the vehicle is a stolen vehicle (Step S83).

Next, a vehicle speed v is acquired (Step S84), and it is judged whether the vehicle speed v is 0 or not (Step S85). When it is concluded that the vehicle speed v is 0, a fuel pump is blocked through the vehicle control interface 4 so as to stop the fuel supply (Step S86). On the contrary, when it is concluded that the vehicle speedy is not 0, a display controller 17 is controlled through the display interface 7 so that a message "This stolen vehicle will be forcibly stopped soon." is displayed on a display 18 (Step S87). Next, the fuel pump is blocked stepwise in accordance with the vehicle speed v through the vehicle control interface 4 (Step S88).

On the other hand, when it is concluded in Step S81 that the vehicle-specific code transmitted from the wireless transmitter 32 has not been received or when it is concluded in Step S82 that the vehicle-specific codes do not coincide with each other, the vehicle is regarded as not a stolen vehicle, and the processing operation (6) is terminated as it is.

According to the vehicle antitheft device according to the embodiment (5), when the owner of a vehicle becomes aware of theft of the vehicle and uses a closest telephone set 42, a portable telephone, or the like, to call the antitheft center 41 and make the antitheft center 41 know that his or her vehicle has been stolen, a vehicle-specific code set for the vehicle is transmitted from the antitheft center 41 to the wireless transmitter 32. Then, the vehicle-specific code is transmitted locally from the wireless transmitter 32. Thus, when the stolen vehicle enters the dock where the wireless transmitter 32 is installed, the engine of the stolen vehicle can be stopped, or the lamp thereof can be blinked.

Thus, a policeman or the like can find the stolen vehicle easily as well as the stolen vehicle can be prevented from being transported overseas. Accordingly, even if vehicle theft occurs, the stolen vehicle can be secured in an early stage.

Incidentally, a stolen vehicle is stopped in consideration of the vehicle speed of the stolen vehicle when the vehicle antitheft device according to any one of the embodiments (1) to (5) is used. However, in a vehicle antitheft device according to another embodiment, running positional information of the stolen vehicle calculated by a navigation system is fetched so that the stolen vehicle can be stopped in a desired position on the basis of the running positional information. In such a manner, it is possible to avoid occurrence of such a situation that the stolen vehicle is stopped in an intersection, a sharp curve, a narrow road, or the like.

In addition, in a vehicle antitheft device according to a further embodiment, it is confirmed whether a signal to be acquired (for example, a signal from a GPS receiver 15 or the wireless receiver 22) has been acquired normally or not, after the vehicle enters the theft occurrence mode. In this case, when it is concluded that such a signal has not been acquired normally, such a receiver is regarded as being broken by the thief, and control may be made to block the fuel pump instantly. In addition, when the signal from the vehicle speed sensor 12 cannot be acquired, the vehicle speed may be obtained from GPS signals.

Incidentally, the judgment as to whether such a signal has been acquired normally or not may be based on judgment as to whether a predetermined period of time has passed or not since GPS signals ceased from input.

Figure 13:
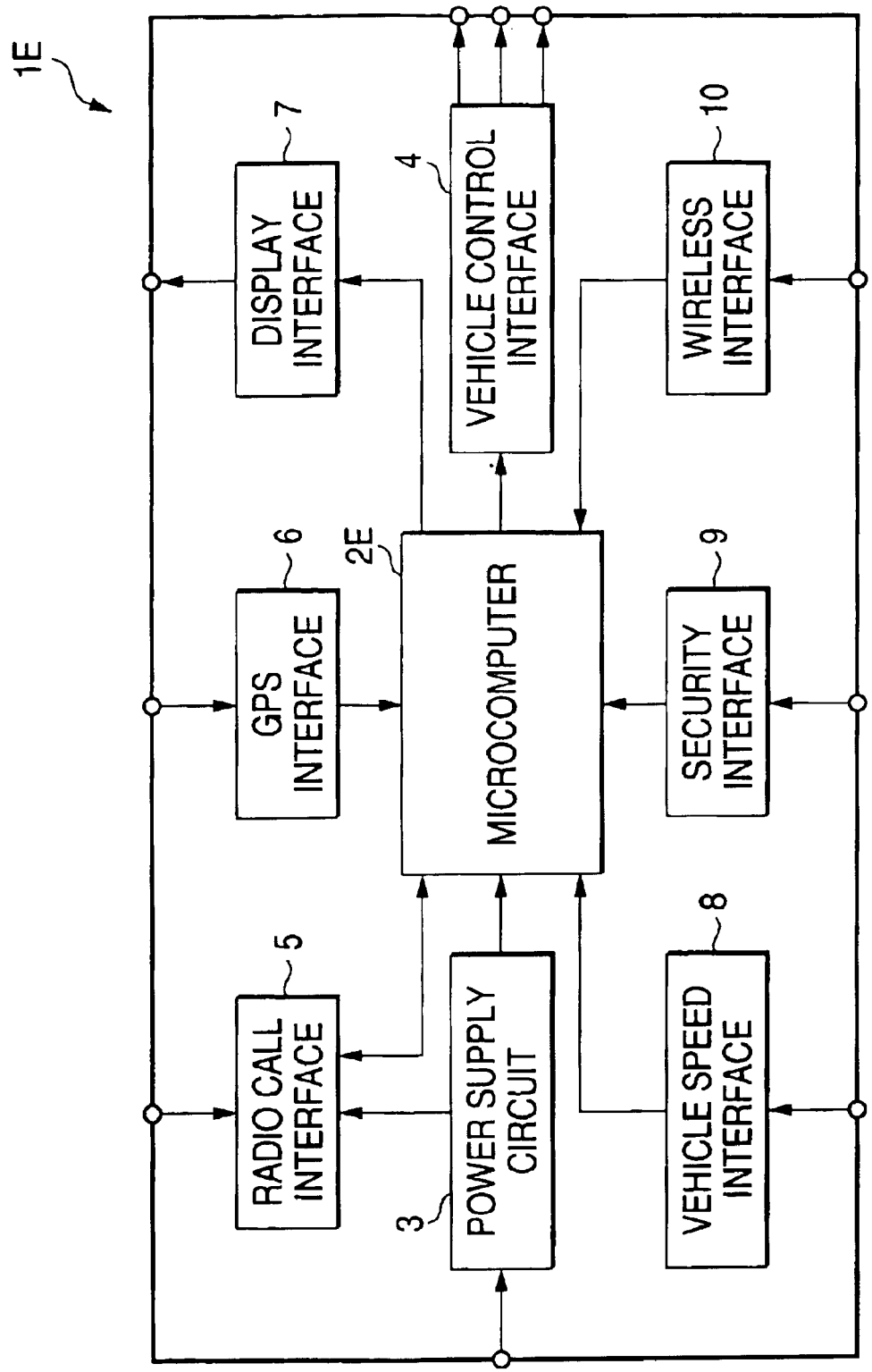
FIG. 13 is a block diagram schematically showing the main portion of a vehicle antitheft device according to an embodiment (6) of the invention.

FIG. 13 is a block diagram schematically showing the main portion of a vehicle antitheft device according to an embodiment (6) of the invention. Incidentally, constituent parts the same as those in the vehicle antitheft devices shown in FIGS. 1, 3 and 5 are denoted by the same numerals, and description thereof will be omitted.

In FIG. 13, the reference numeral 1E represents a vehicle antitheft device 1E. The vehicle antitheft device 1E includes a microcomputer 2E, a power supply circuit 3, a vehicle control interface 4, a radio call interface 5, a GPS interface 6, a display interface 7, a vehicle speed interface 8, a security interface 9 and a wireless interface 10. The microcomputer 2E has rewritable programs and data. The power supply circuit 3 supplies power to the microcomputer 2E. A signal received by a radio call receiver 13 (FIG. 5) is inputted through the radio call interface 5. GPS signals received by a GPS receiver 15 (FIG. 1) are inputted through the GPS interface 6. The display interface 7 is connected to a display controller 17 (FIG. 1). The vehicle speed interface 8 is connected to a vehicle speed sensor 12 (FIG. 1) for detecting the vehicle speed. A theft occurrence signal is fetched from a security device 19 (FIG. 1) through the security interface 9. A signal received by a wireless receiver 22 (FIG. 3) is inputted through the wireless interface 10.

Figure 2:
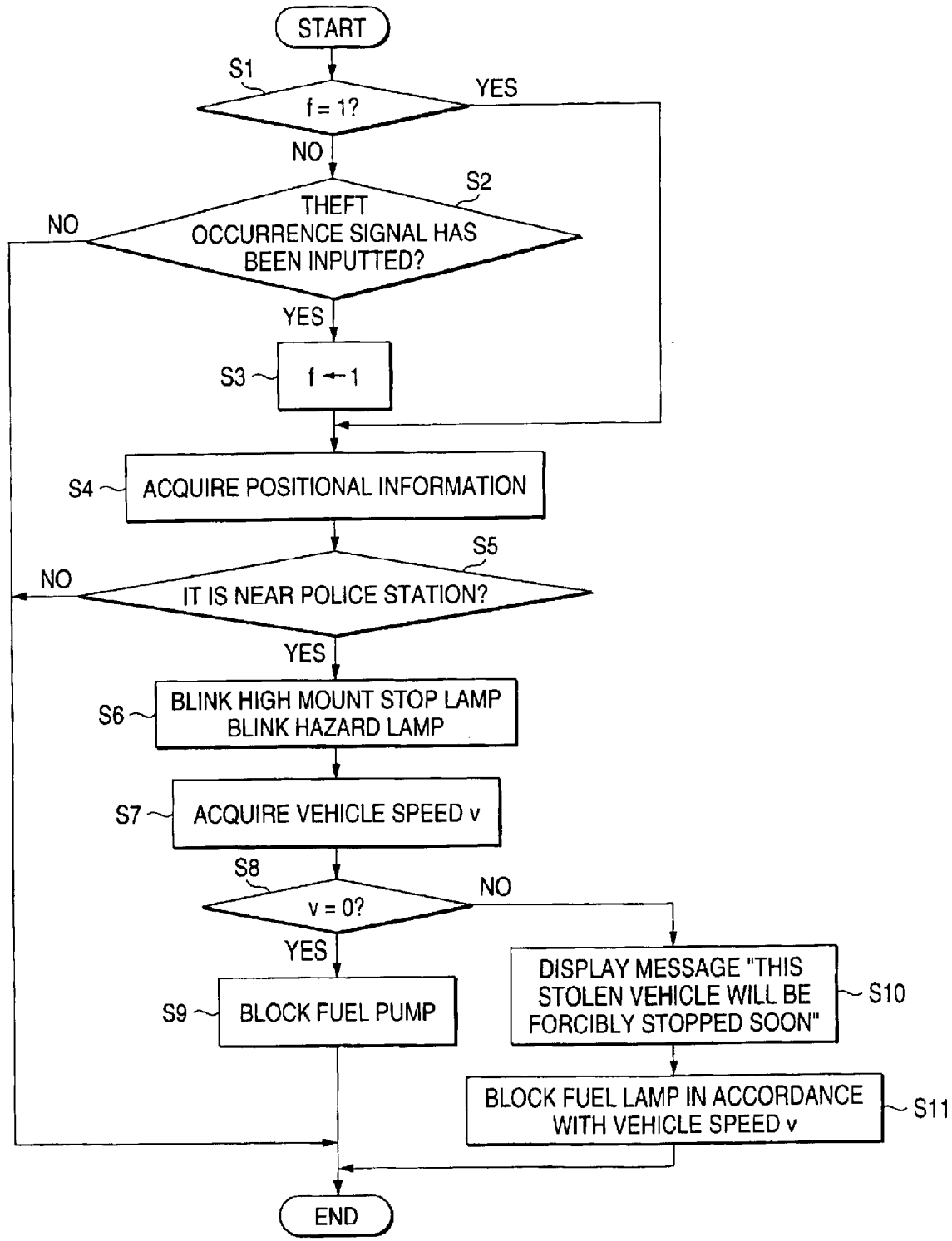
FIG. 2 is a flow chart showing the processing operation to be executed by a microcomputer in the vehicle antitheft device according to the embodiment (1).

According to the vehicle antitheft device according to the embodiment (6), the power supply circuit 3 is connected to a battery 11 (FIG. 1) mounted on a vehicle, the vehicle control interface 4 is connected to control lines for a fuel pump, a high mount stop lamp and a hazard lamp, the GPS interface 6 is connected to the GPS receiver 15, the display interface 7 is connected to the display controller 17, the vehicle speed interface 8 is connected to the vehicle speed sensor 12, the security interface 9 is connected to the security device 19, and further a program for putting the processing operation shown in FIG. 2 into practice is written into the microcomputer 2E. In such a manner, the vehicle antitheft device according to the embodiment (1) can be realized.

Alternatively, the interfaces are connected to various pieces of equipment mounted on the vehicle respectively in the same manner while a desired program is written into the microcomputer 2E. In such a manner, a vehicle antitheft device according to any one of the embodiments (2) to (5) or a vehicle antitheft device made by a combination of these vehicle antitheft devices according to the embodiments (2) to (5) can be realized.

Accordingly, a vehicle antitheft device having general-purpose properties can be realized so that the cost can be reduced, and further requests of users can be satisfied strictly.

What is claimed is:

1. A vehicle antitheft device comprising:
   a theft occurrence detection unit for detecting occurrence of vehicle theft and outputting a theft signal;
   a position information detection unit for detecting position information of a vehicle and outputting a position signal;
   a microcomputer for judging whether the vehicle is in a predetermined area when the vehicle theft occurs based on the theft signal and the position signal; and
   a vehicle controller for making predetermined control on the vehicle when the microcomputer concludes that the vehicle is in the predetermined area.

2. A vehicle antitheft device comprising:
   a theft occurrence detection unit for detecting occurrence of vehicle theft and outputting a theft signal;
   a first reception unit for receiving a local signal, which includes a vehicle control code and is transmitted locally in a predetermined area;
   a microcomputer for judging whether the vehicle control code has been received when the vehicle theft occurs based on the theft signal and the local signal; and
   a vehicle controller for making predetermined control on a vehicle when the microcomputer concludes that the vehicle control code has been received.

3. A vehicle antitheft device comprising:
   a theft occurrence detection unit for detecting occurrence of vehicle theft and outputting a theft signal;
   a reception unit for receiving a call signal, which includes call identification information and is transmitted through a public circuit;

a microcomputer for judging whether a vehicle is out of a service area for reception of the call signal when the vehicle theft occurs based on the theft signal and a reception state of the reception unit; and a vehicle controller for making predetermined control on the vehicle when the microcomputer concludes that the vehicle is out of the service area.

4. The vehicle antitheft device according to claim 1, wherein the microcomputer further judges whether the vehicle theft has occurred based on the theft signal, confirms whether a signal to be acquired has been acquired normally, when the microcomputer concludes that vehicle theft has occurred, and performs predetermined processing based on an obtained confirmation result.

5. The vehicle antitheft device according to claim 2, wherein the microcomputer further judges whether the vehicle theft has occurred based on the theft signal, confirms whether a signal to be acquired has been acquired normally, when the microcomputer concludes that vehicle theft has occurred, and performs predetermined processing based on an obtained confirmation result.

6. The vehicle antitheft device according to claim 3, wherein the microcomputer further judges whether the vehicle theft has occurred based on the theft, confirms whether a signal to be acquired has been acquired normally, when the microcomputer concludes that vehicle theft has occurred, and performs predetermined processing based on an obtained confirmation result.

7. A vehicle antitheft device comprising:

a second reception unit for receiving a call signal, which includes call identification information and is transmitted through a public circuit;

a microcomputer for judging whether a theft occurrence code, which is set in advance, has been received, based on the call signal;

a first reception unit for receiving a local signal, which includes a vehicle control code and is transmitted locally in a predetermined area;

wherein the microcomputer further judges whether the vehicle control code has been received based on the local signal, when the microcomputer concludes that the theft occurrence code has been received; and a vehicle controller for making predetermined control on the vehicle when the microcomputer concludes that the vehicle control code has been received.

8. A vehicle antitheft device comprising:

a reception unit for receiving a call signal, which includes call identification information and is transmitted through a public circuit;

a microcomputer for judging whether a theft occurrence code, which is set in advance, has been received, based on the call signal;

a position information detection unit for detecting position information of a vehicle and outputting a position signal;

wherein the microcomputer further judges whether the vehicle is in a predetermined area based on the position signal, when the microcomputer concludes that the theft occurrence code has been received; and a vehicle controller for making predetermined control on the vehicle when the microcomputer concludes that the vehicle is in the predetermined area.

9. The vehicle antitheft device according to claim 7, further comprising:

a position information detection unit for detecting position information of a vehicle and outputting a position signal;

a first selection unit for selecting a service area for reception of the call signal, based on the position signal; and a first switching unit for switching the service area based on selection of the first selection unit.

10. The vehicle antitheft device according to claim 8, further comprising:

a position information detection unit for detecting position information of a vehicle and outputting a position signal;

a first selection unit for selecting a service area for reception of the call signal, based on the position signal; and a first switching unit for switching the service area based on selection of the first selection unit.

11. The vehicle antitheft device according to claim 9, further comprising:

a second selection unit for selecting a service area for reception of the call signal, based on a reception state of the second reception unit; and a second switching unit for switching the service area based on selection of the second selection unit.

12. The vehicle antitheft device according to claim 10, further comprising:

a second selection unit for selecting a service area for reception of the call signal, based on a reception state of the second reception unit; and a second switching unit for switching the service area based on selection of the second selection unit.

13. A vehicle antitheft device comprising:

a reception unit for receiving a call signal, which includes call identification information and is transmitted through a public circuit;

a microcomputer for judging whether a theft occurrence code, which is set in advance, has been received, based on the call signal and for judging whether a vehicle is out of a service area for reception of the call signal, based on a reception state of the second reception unit, when the microcomputer concludes that the theft occurrence code has been received; and a vehicle controller for making predetermined control on the vehicle when the microcomputer concludes that the vehicle is out of the service area.

14. The vehicle antitheft device according to claim 7, further comprising:

a theft occurrence code storage unit for storing the theft occurrence code; and theft occurrence code writing means for writing a code desired by a user into the theft occurrence code storage unit as the theft occurrence code.

15. The vehicle antitheft device according to claim 8, further comprising:

a theft occurrence code storage unit for storing the theft occurrence code; and theft occurrence code writing means for writing a code desired by a user into the theft occurrence code storage unit as the theft occurrence code.

16. The vehicle antitheft device according to claim 13, further comprising:

a theft occurrence code storage unit for storing the theft occurrence code; and theft occurrence code writing means for writing a code desired by a user into the theft occurrence code storage unit as the theft occurrence code.

17. The vehicle antitheft device according to claim 7, wherein the microcomputer confirms whether a signal to be acquired has been acquired normally, when the microcomputer concludes that the theft occurrence code has been received, and performs predetermined processing based on a confirmation result obtained by the second confirmation unit.

18. The vehicle antitheft device according to claim 8, wherein the microcomputer confirms whether a signal to be acquired has been acquired normally, when the microcomputer concludes that the theft occurrence code has been received, and performs predetermined processing based on a confirmation result obtained by the second confirmation unit.

19. The vehicle antitheft device according to claim 13, wherein the microcomputer confirms whether a signal to be acquired has been acquired normally, when the microcomputer concludes that the theft occurrence code has been received, and performs predetermined processing based on a confirmation result obtained by the second confirmation unit.

20. The vehicle antitheft device according to claim 7, wherein the microcomputer judges whether a fault diagnosis code, which is set in advance and is transmitted through a public circuit, has been received, the vehicle antitheft device further comprising:
fault diagnosis means for performing fault diagnosis when the microcomputer concludes that the fault diagnosis code has been received; and
notification means for notifying outside of a diagnosis result obtained by the fault diagnosis means.

21. The vehicle antitheft device according to claim 8, wherein the microcomputer judges whether a fault diagnosis code, which is set in advance and is transmitted through a public circuit, has been received, the vehicle antitheft device further comprising:
fault diagnosis means for performing fault diagnosis when the microcomputer concludes that the fault diagnosis code has been received; and
notification means for notifying outside of a diagnosis result obtained by the fault diagnosis means.

22. The vehicle antitheft device according to claim 13, wherein the microcomputer judges whether a fault diagnosis code, which is set in advance and is transmitted through a public circuit, has been received, the vehicle antitheft device further comprising:
fault diagnosis means for performing fault diagnosis when the microcomputer concludes that the fault diagnosis code has been received; and
notification means for notifying outside of a diagnosis result obtained by the fault diagnosis means.

23. A vehicle antitheft device comprising:
a vehicle-specific code storage unit for storing a vehicle-specific code set for each vehicle;
a reception unit for receiving a local signal, which includes the vehicle-specific code and is transmitted locally in a predetermined area;
a microcomputer for judging whether the vehicle-specific code stored in the vehicle-specific code storage unit has been received, based on the local signal and the vehicle-specific code stored in the vehicle-specific code storage unit; and
a vehicle controller for making predetermined control on the vehicle when the microcomputer concludes that the vehicle-specific code stored in the vehicle-specific code storage unit has been received.

24. A vehicle antitheft device comprising:
a microcomputer having rewritable programs and data;
a first interface for outputting a control signal for making predetermined control on a vehicle;
a second interface for fetching a theft signal indicating that vehicle theft occurs;
a third interface for fetching a position signal indicating position information of the vehicle;
a fourth interface for fetching a call signal, which is transmitted through a public circuit and includes call identification information; and
a fifth interface for fetching a local signal, which includes a vehicle control code and is transmitted locally in a first predetermined area;
wherein the microcomputer includes at least one of:
a first combined unit having:
a judgment unit for judging whether the vehicle is in a second predetermined area based on the theft signal and the position signal, when the vehicle theft occurs; and
a controller unit for making predetermined control on the vehicle when the judgment unit concludes that the vehicle is in the first predetermined area;
a second combined unit having:
a judgment unit for judging whether the vehicle control code has been received based on the theft signal and the local signal, when the vehicle theft occurs; and
a controller for making predetermined control on a vehicle when the judgment unit concludes that the vehicle control code has been received;
a third combined unit having:
a judgment unit for judging whether the vehicle is out of a service area for reception of the call signal based on the theft signal and a reception state of the call signal, when the vehicle theft occurs; and
a controller for making predetermined control on the vehicle when the judgment unit concludes that the vehicle is out of the service area;
a fourth combined unit having:
a judgment unit for judging whether a theft occurrence code, which is set in advance, has been received, based on the call signal, and for judging whether the vehicle control code has been received, based on the local signal, when the judgment unit concludes that the theft occurrence code has been received; and
a controller for making predetermined control on the vehicle when the judgment unit concludes that the vehicle control code has been received;
a fifth combined unit having:
a judgment unit for judging whether a theft occurrence code, which is set in advance, has been received, based on the call signal and for judging whether the vehicle is in the second predetermined area based on the position signal, when the judgment unit concludes that the theft occurrence code has been received; and
a controller for making predetermined control on the vehicle when the judgment unit concludes that the vehicle is in the second predetermined area; and
a sixth combined unit having:
a judgment unit for judging whether the vehicle control code has been received, based on the local signal, when the judgment unit concludes that the theft occurrence code has been received and judging whether the vehicle is out of the service area for reception of the call signal, based on the reception state of the call signal, when the judgment unit concludes that the theft occurrence code has been received; and
a controller for making predetermined control on the vehicle when the judgment unit concludes that the vehicle is out of the service area.

25. A vehicle antitheft device comprising:
a microcomputer having rewritable programs and data;
a first interface for outputting a control signal for making predetermined control on a vehicle;
a second interface for fetching a theft signal indicating that vehicle theft occurs;
a third interface for fetching a position signal indicating position information of the vehicle;
a fourth interface for fetching a call signal, which is transmitted through a public circuit and includes call identification information; and
a fifth interface for fetching a local signal, which includes a vehicle-specific code and is transmitted locally in a first predetermined area; and
a vehicle-specific code storage unit for storing the vehicle-specific code, which is set for each vehicle;
wherein the microcomputer includes at least one of:
a first combined unit having:
   a judgment unit for judging whether the vehicle is in a second predetermined area based on the theft signal and the position signal, when the vehicle theft occurs; and
   a controller for making predetermined control on the vehicle when the judgment unit concludes that the vehicle is in the first predetermined area;
a second combined unit having:
   a judgment unit for judging whether the vehicle is out of a service area for reception of the call signal based on the theft signal and a reception state of the call signal, when the vehicle theft occurs; and
   a controller for making predetermined control on the vehicle when the judgment unit concludes that the vehicle is out of the service area;
a third combined unit having:
   a judgment unit for judging whether a theft occurrence code, which is set in advance, has been received, based on the call signal and for judging whether the vehicle is in the second predetermined area based on the position signal, when the judgment unit concludes that the theft occurrence code has been received; and
   a controller for making predetermined control on the vehicle when the judgment unit concludes that the vehicle is in the second predetermined area;
a fourth combined unit having:
   a judgment unit for judging whether the vehicle control code has been received, based on the local signal, when the judgment unit concludes that the theft occurrence code has been received and for judging whether the vehicle is out of the service area for reception of the call signal, based on the reception state of the call signal, when the judgment unit concludes that the theft occurrence code has been received; and
   a controller for making predetermined control on the vehicle when the judgment unit concludes that the vehicle is out of the service area; and
a fifth combined unit having:
   a judgment unit for judging whether the vehicle-specific code stored in the vehicle-specific code storage unit has been received, based on the local signal and the vehicle-specific code stored in the vehicle-specific code storage unit; and
   a controller for making predetermined control on the vehicle when the judgment unit concludes that the vehicle-specific code stored in the vehicle-specific code storage unit has been received.

26. A vehicle antitheft system comprising:
a vehicle antitheft device including:
a theft occurrence detection unit for detecting occurrence of vehicle theft and outputting a theft signal;
a first reception unit for receiving a local signal including a vehicle control code;
a judgment unit for judging whether the vehicle control code has been received based on the theft signal and the local signal, when the vehicle theft occurs; and
a controller for making predetermined control on a vehicle when the judgment unit concludes that the vehicle control code has been received; and
a first transmission device disposed in a predetermined area, the first transmission device including a transmission unit for locally transmitting the local signal.

27. A vehicle antitheft system comprising:
a vehicle antitheft device including:
   a second reception unit for receiving a call signal, which includes a call identification information and is transmitted through a public circuit;
   a judgment unit for judging whether a theft occurrence code, which is set in advance, has been received, based on the call signal;
   a first reception unit for receiving a local signal, which includes a vehicle control code;
   wherein the judgment unit further judges whether the vehicle control code has been received based on the local signal, when the judgment unit concludes that the theft occurrence code has been received; and
   a controller for making predetermined control on the vehicle when the judgment unit concludes that the vehicle control code has been received; and
   a first transmission device disposed in a predetermined area, the first transmission device including a transmission unit for locally transmitting the local signal when the judgment unit concludes that the theft occurrence code has been received.

28. A vehicle antitheft system comprising:
a vehicle antitheft device including:
   a vehicle-specific code storage unit for storing a vehicle-specific code set for each vehicle;
   a first reception unit for receiving a local signal, which includes the vehicle-specific code;
   a judgment unit for judging whether the vehicle-specific code stored in the vehicle-specific code storage unit has been received, based on the local signal and the vehicle-specific code stored in the vehicle-specific code storage unit; and
   a controller for making predetermined control on the vehicle when the judgment unit concludes that the vehicle-specific code stored in the vehicle-specific code storage unit has been received; and
a transmission device disposed in a predetermined area, the first transmission device including:
   a vehicle-specific code storage unit for storing the vehicle-specific code;
   a second reception unit for receiving the vehicle-specific code transmitted from external;

a storage unit for storing the vehicle-specific code received by the second reception unit into the vehicle-specific code storage unit, wherein the transmission unit locally transmits the local signal including the vehicle-specific code stored in the vehicle-specific code storage unit.

* * * * *